US007552304B2

(12) United States Patent
Marchal et al.

(10) Patent No.: US 7,552,304 B2
(45) Date of Patent: Jun. 23, 2009

(54) COST-AWARE DESIGN-TIME/RUN-TIME MEMORY MANAGEMENT METHODS AND APPARATUS

(75) Inventors: Paul Marchal, Blanden (BE); Jose Ignacio Gomez, Madrid (ES); Davide Bruni, Bologna (IT); Francky Catthoor, Temse (BE)

(73) Assignee: Interuniversitair Microelektronica Centrum (IMEC), Leuven (BE)

( * ) Notice: Subject to any disclaimer, the term of this patent is extended or adjusted under 35 U.S.C. 154(b) by 737 days.

(21) Appl. No.: 11/133,155

(22) Filed: May 18, 2005

(65) Prior Publication Data

US 2006/0018179 A1 Jan. 26, 2006

Related U.S. Application Data

(63) Continuation of application No. PCT/BE03/00202, filed on Nov. 18, 2003.

(30) Foreign Application Priority Data

Nov. 18, 2002 (GB) ................................. 0226776.3

(51) Int. Cl.
*G06F 12/02* (2006.01)
(52) U.S. Cl. ........................................ 711/170; 713/320
(58) Field of Classification Search ................. 711/170; 713/320
See application file for complete search history.

(56) References Cited

OTHER PUBLICATIONS

V. Delaluz, M. Kandemir, N. Vijaykrishnan, A. Sivasubramaniam, and M. Irwin, "Hardware and Software Techniques for Controlling DRAM Power Modes", IEEE Trans. Computers, 50(11):1154-1173, Nov. 2001.*

Berger et al., Hoard: A scalable memory allocator for multithreaded applications, *ASPLOS 2000* Cambridge, MA USA, 12 pgs (2000).
Chang et al., Array allocation taking into account SDRAM characteristics, Design Automation Conference, 2000. Proceedings of the ASP-DAC 2000. Asia and South Pacific Yokohama, Japan Jan. 25-28, 2000, Piscataway, NJ, IEEE, pp. 497-502 (2000).
Delaluz et al., Hardware and software techniques for controlling DRAM power modes, IEEE Transactions on Computers, 50(11):1154-1173 (2001).
Furber, ARM System Architecture, Addison-Wesley, pp. 271-286.
Itoh, VLSI Memory Chip Design, Springer, pp. 339-387.
John, Data placement schemes to reduce conflicts in interleaved memories, *The Computer Journal*, 43(2):138-151 (2000).

(Continued)

*Primary Examiner*—Kevin L Ellis
*Assistant Examiner*—Jared I Rutz
(74) *Attorney, Agent, or Firm*—Knobbe Martens Olson & Bear LLP

(57) ABSTRACT

Methods, apparatus and software products are described for design-time data-assignment techniques for hierarchical memories, e.g., multi-banked memories in an essentially digital system as well as methods, apparatus and software products for run-time memory management techniques of such a system. Memory assignment techniques are described for assigning data to a hierarchical memory particularly for multi-tasked applications where data of dynamically created/deleted tasks is allocated at run-time. The energy consumption of hierarchical memories such as multi-banked memories depends largely on how data is assigned to the memory banks. Methods, apparatus and software products are described for design-time data-assignment techniques for hierarchical memories, e.g., multi-banked memories in an essentially digital system which improve a cost function such as energy consumption.

27 Claims, 19 Drawing Sheets

OTHER PUBLICATIONS

Marchal et al., SDRAM-energy-aware memory allocation for dynamic multi-media applications on multi-processor platforms, Design, Automation and Test in Europe Conference and Exhibition, 2003 Munich, Germany, Mar. 3-7, 2003, Los Alamitos, CA, IEEE Comput. Soc., pp. 516-521 (2003).

Panda, Memory bank customization and assignment in behavioral synthesis, Computer-Aided Design, 1999, Digest of Technical Papers. 1999 IEEE/ACM International Conference on San Jose, CA, IEEE, pp. 477-481 (1999).

Yang et al., Managing dynamic concurrent tasks in embedded real-time multimedia systems, 15th International Symposium on System Synthesis, ISSS, Kyoto, Japan, Oct. 2-4, 2000, International Symposium on System Synthesis, ISSS, New York, NY, pp. 112-119 (2002).

* cited by examiner

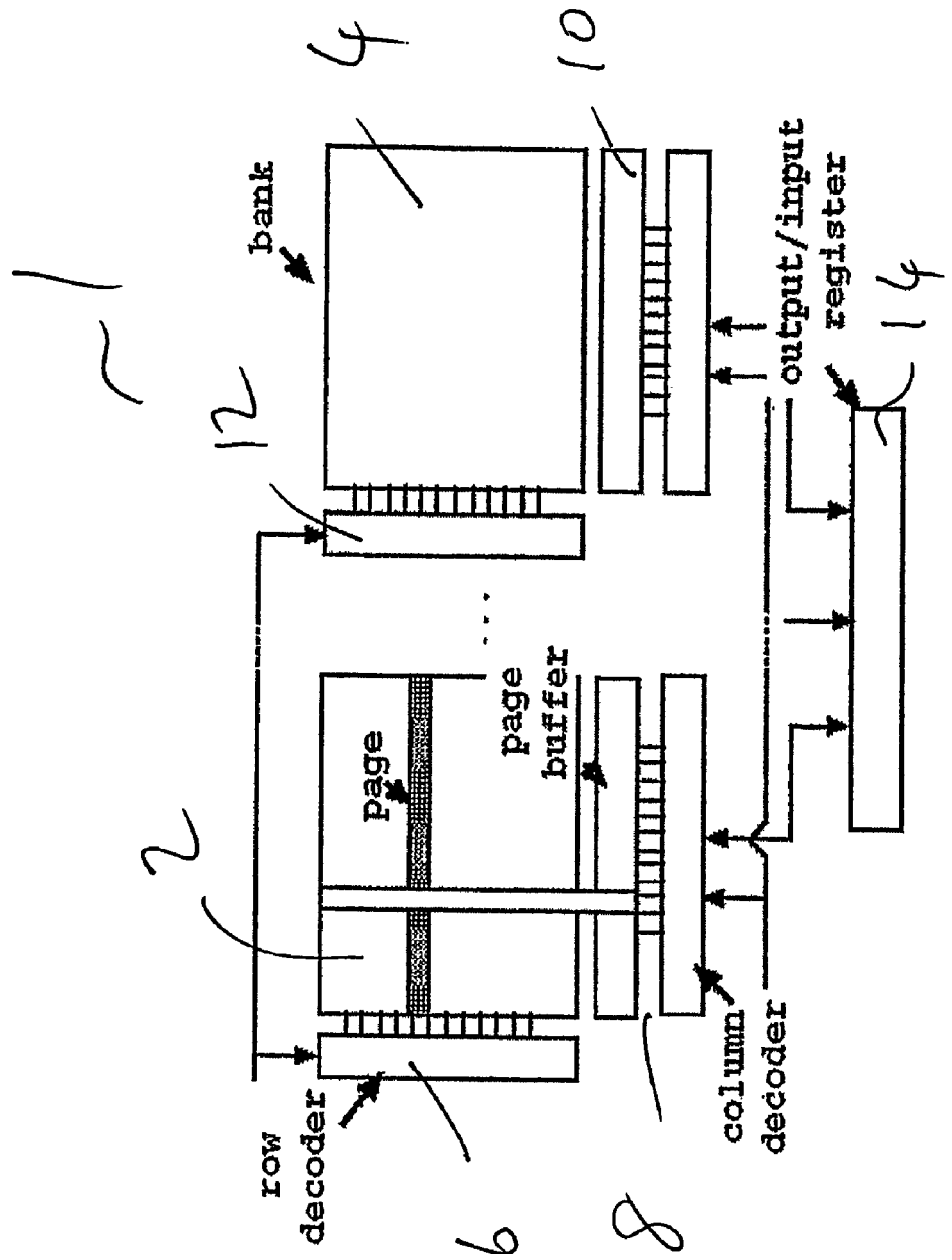
Figure 1. Multi-banked SDRAM architecture

Convolve

```
for (i = 0; i < K; i++) {
    for (j = 0; j < K; j++)
    {... = imgin[i][j] * kernel[i*K][j];}
}
imgout[r*col][] = ...
```

Cmp_threshold

```
for (i = 0; i < row; i++) {
    for (j = 0; j < col; j++) {
        tmp1 = img1[i][j];
    }
}
```

Figure 2. Extracts from *Convolve* and *Cmp_threshold*

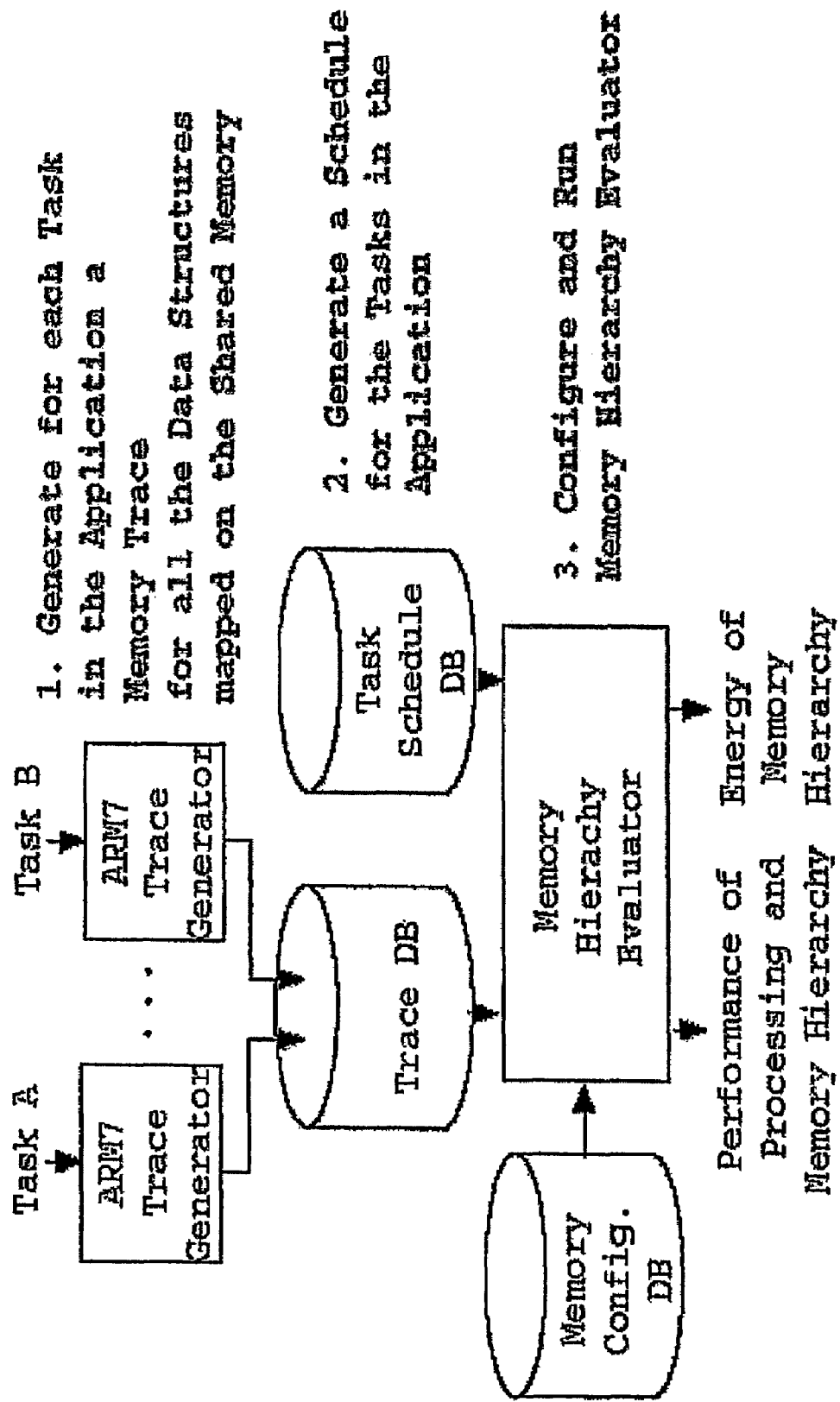
Figure 3. Simulation Environment

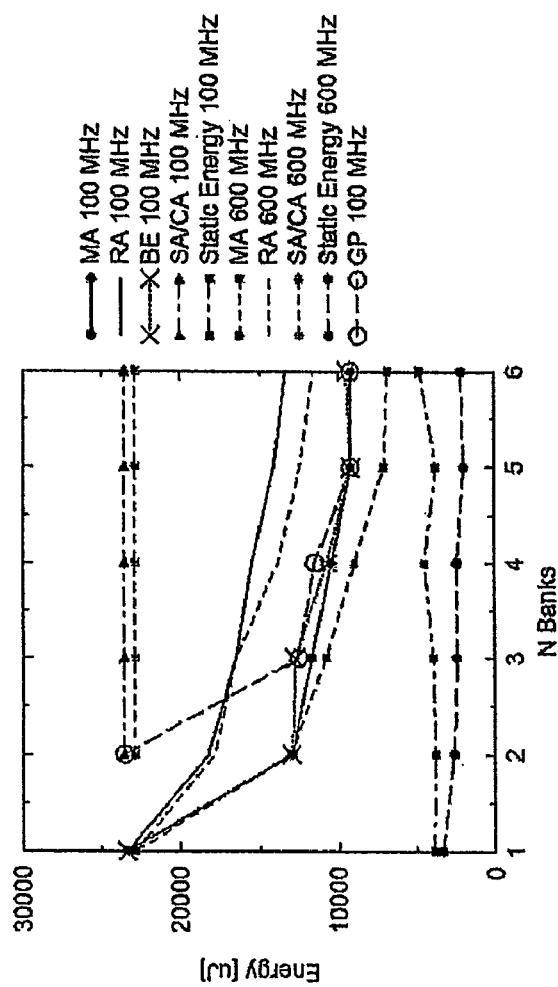
Figure 4. Different Allocators Strategies for *Convolve* and *Cmp_threshold*

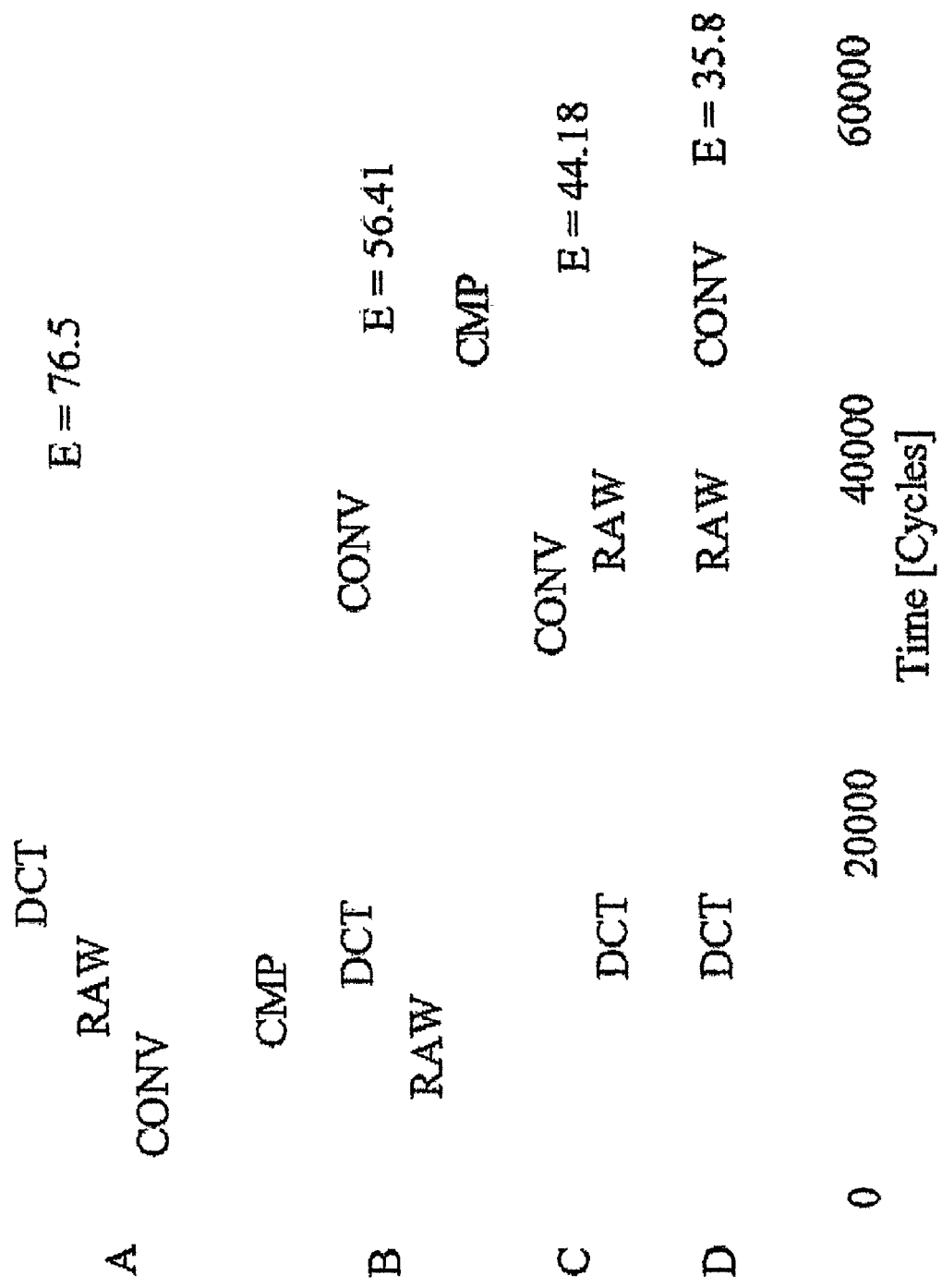
Figure 5. Scheduling outputs for four tasks

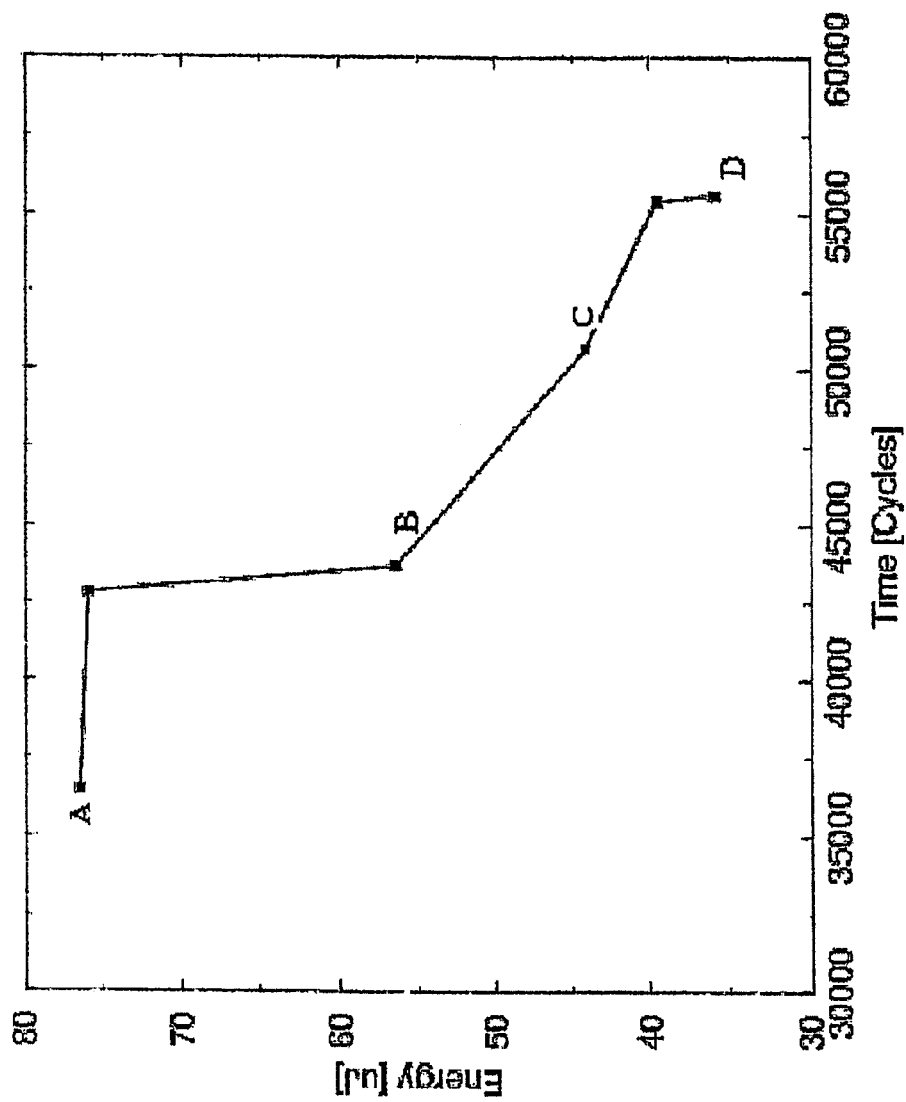
Figure 6. Pareto Curve for four tasks

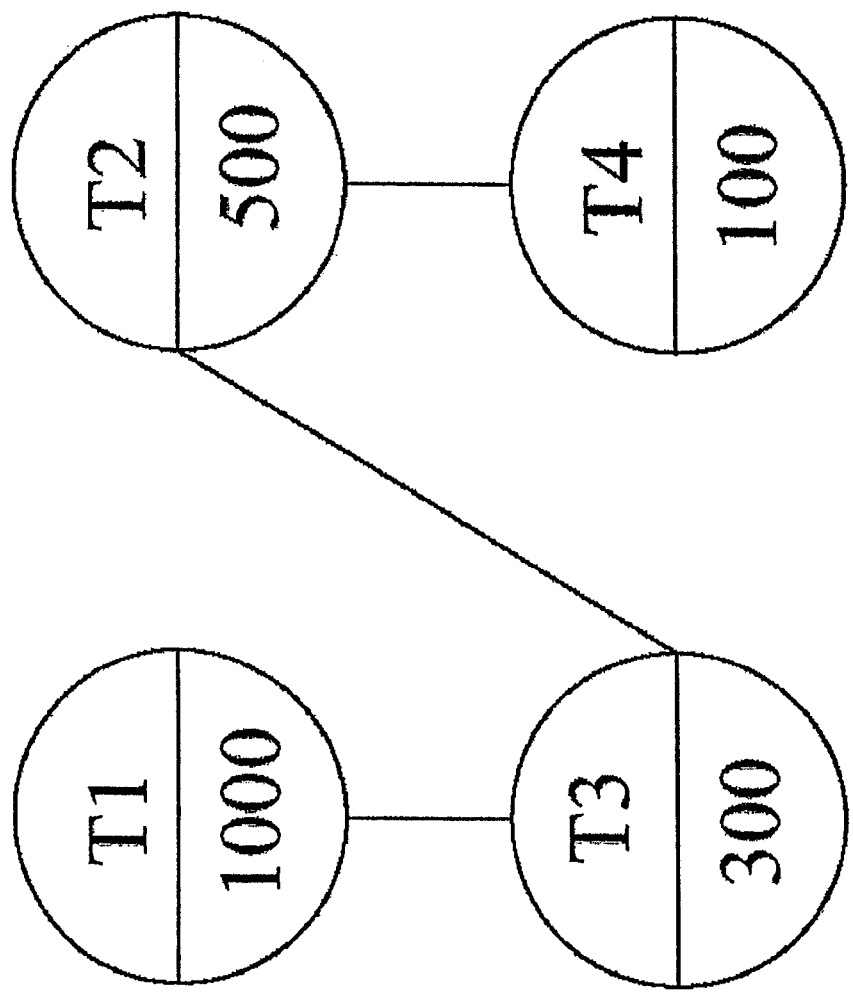
Figure 7. Task Independence Graph

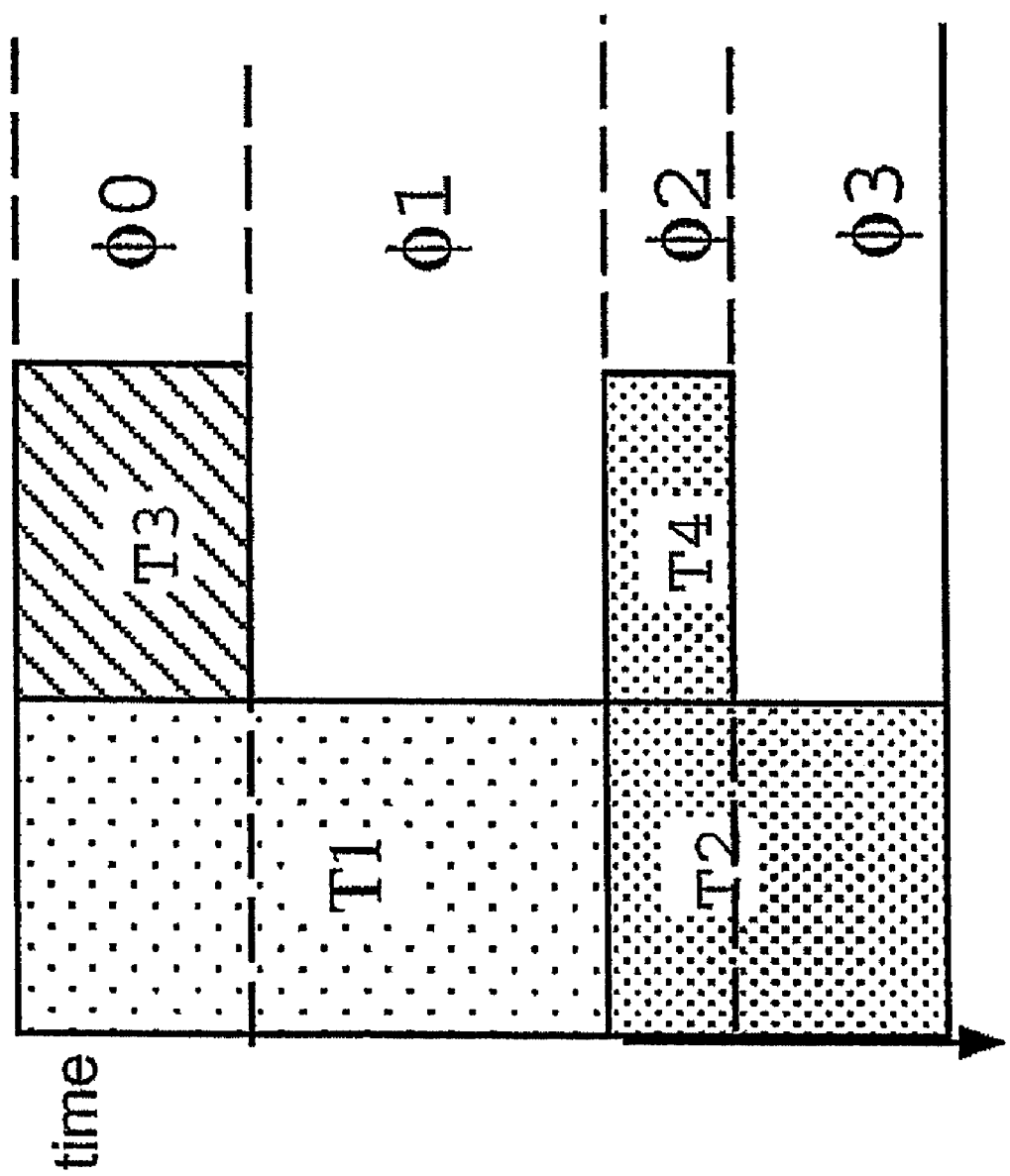
Figure 8. Output of the List Scheduler for four tasks

| $E_{precharge/activate}$ | 14000 pJ/miss |
|---|---|
| $E_{read/write}$ | 2000 pJ/access |
| $P_{stdby}$ | 50 mW |
| $P_{cs}$ with self refresh | 10.8 mW |
| $P_{pwdn}$ | 0 mW |

Table 1. Energy Consumption Parameters

Fig. 9

| Task | $N_{ds}$ | $N_{banks}$ | | | | | |
|---|---|---|---|---|---|---|---|
| | | 1 | 2 | 3 | 4 | 5 | 6 |
| Cmp_threshold | 3 | 4331 | 3293 | 993 | - | - | - |
| Fir | 3 | 1770 | 457 | 489 | - | - | - |
| Lzw | 3 | 6482 | 7004 | 7655 | - | - | - |
| Rawcaudio | 4 | 4202 | 2998 | 3234 | 4061 | - | - |
| Convolve | 4 | 19222 | 8173 | 8474 | 8474 | - | - |
| Rinjadel | 4 | 7037 | 6491 | 6870 | 7277 | - | - |
| Rgb2Yuv | 5 | 528 | 796 | 1064 | 1333 | 1593 | - |
| Dct | 6 | 2552 | 2845 | 2118 | 2540 | 3015 | 3485 |
| Quick24to8 | 10 | 6930 | 5597 | 4215 | 4417 | 4620 | 4824 |

Table 2. Energy for Benchmark Tasks @100MHz

Fig. 10

| Task(100MHz) | $N_{ds}$ | $N_{banks}$ | | | | | |
|---|---|---|---|---|---|---|---|
| | | 1(CA) | 2 | 3 | 4 | 5 | 6 |
| Fir.+Conv.(SA) | 7 | - | 20993 | 20993 | 20993 | 20993 | 20993 |
| Fir.+Conv.(MA) | 7 | 20958 | 9858 | 9269 | 8641 | 8641 | 8641 |
| Fir.+Conv.(RA) | 7 | 20958 | 15712 | 13834 | 12381 | 12436 | 10990 |
| Fir.+Conv.(GP) | 7 | - | 20993 | 9943 | 8641 | 8641 | 8641 |
| Fir.+Conv.(BE) | 7 | 20958 | 10250 | 9269 | 9515 | 8942 | 8964 |
| R2Y.+Cmp_t.(SA) | 8 | - | 4859 | 4859 | 4859 | 4859 | 4859 |
| R2Y.+Cmp_t.(MA) | 8 | 4986 | 3832 | 1877 | 1521 | 1521 | 1521 |
| R2Y.+Cmp_t.(RA) | 8 | 4986 | 4362 | 3733 | 3407 | 3368 | 3209 |
| R2Y.+Cmp_t.(GP) | 8 | - | 4859 | 3821 | 1521 | 1521 | 1521 |
| R2Y.+Cmp_t.(BE) | 8 | 4986 | 4041 | 2031 | 1553 | 1821 | 2089 |
| R2Y.+Cmp_t.+Conv.(SA) | 12 | - | - | 24082 | 24082 | 24082 | 24082 |
| R2Y.+Cmp_t.+Conv.(MA) | 12 | 23531 | 13872 | 12456 | 11392 | 10109 | 10060 |
| R2Y.+Cmp_t.+Conv.(RA) | 12 | 23531 | 19730 | 17005 | 15444 | 14977 | 14533 |
| R2Y.+Cmp_t.+Conv.(GP) | 12 | - | - | 24082 | 13034 | 11987 | 9695 |
| R2Y.+Cmp_t.+Conv.(BE) | 12 | 23531 | 13769 | 13468 | 11515 | 9907 | 10206 |
| R2Y.+Cmp_t.+Conv.+Dct (SA) | 18 | - | - | - | 26647 | 26647 | 26647 |
| R2Y.+Cmp_t.+Conv.+Dct (MA) | 18 | 26195 | 16684 | 15165 | 13665 | 13132 | 12514 |
| R2Y.+Cmp_t.+Conv.+Dct (RA) | 18 | 26195 | 21896 | 19332 | 17947 | 17517 | 17696 |
| R2Y.+Cmp_t.+Conv.+Dct (GP) | 18 | - | - | - | 26647 | 15598 | 14551 |
| R2Y.+Cmp_t.+Conv.+Dct (BE) | 18 | 26195 | 16212 | 16143 | 14224 | 13405 | 12758 |
| Task(600 MHz) | $N_{ds}$ | 1(CA) | 2 | 3 | 4 | 5 | 6 |
| Fir.+Conv.(SA) | 7 | - | 20305 | 20305 | 20305 | 20305 | 20305 |
| Fir.+Conv.(MA) | 7 | 20480 | 9261 | 7582 | 6600 | 6494 | 6473 |
| Fir.+Conv.(RA) | 7 | 20480 | 14938 | 11664 | 11421 | 10115 | 9196 |
| Fir.+Conv.(GP) | 7 | - | 20305 | 8395 | 7842 | 6494 | 6473 |
| Fir.+Conv.(BE) | 7 | 20480 | 9526 | 8219 | 7623 | 6494 | 6473 |

| Task | $N_{ds}$ | 8 | 16 | 32 |
|---|---|---|---|---|
| 2Quick.+2R2Y+2Rin.+Cmp_t.+2Lzw(SA) | 50 | - | 48788 | 48788 |
| 2Quick.+2R2Y+2Rin.+Cmp_t.+2Lzw(RA) | 50 | 49525 | 41872 | 45158 |
| 2Quick.+2R2Y+2Rin.+Cmp_t.+2Lzw(MA) | 50 | 47437 | 37963 | 41610 |
| 2Quick.+2R2Y+2Rin.+Cmp_t.+2Lzw(GP) | 50 | - | 38856 | 34236 |
| 2Quick.+2R2Y+2Rin.+Cmp_t.+2Lzw(BE) | 50 | 51215 | 40783 | 35371 |
| Static Energy | 50 | 10227 | 9045 | 8489 |

Table 3. Energy Comparison of Different Allocation Strategies

Fig. 11

| Task | $N_{ds}$ | SDRAM Energy(uJ) | Time(cycles) | Page-misses | N. accesses |
|---|---|---|---|---|---|
| Cmp_threshold | 3 | 0,7452 | 614 | 5 | 241 |
| Convolve | 3 | 5,96 | 7168 | 134 | 1349 |
| Rawcaudio | 4 | 15,227 | 17498 | 578 | 2124 |
| Dct | 6 | 13,917 | 30295 | 442 | 2387 |

Table 4. Task set definition

Fig. 12

| $N_{banks}$ | Parallel Schedule | | Pareto Schedules | | | | Sequential Schedule | |
|---|---|---|---|---|---|---|---|---|
| | Time | Energy | Time | Energy | Time | Energy | Time | Energy |
| 2 | 78510 | 186 | 76422 | 161 | 86470 | 132 | 119980 | 94 |
| 4 | 71047 | 144 | 70070 | 113 | 84608 | 90 | 112006 | 75 |
| 6 | 69031 | 123 | 66949 | 94 | 80903 | 78 | 103459 | 71 |
| 12 | 64695 | 98 | 62808 | 74 | 95344 | 68 | 110291 | 70 |

Table 5. Energy/Time Trade-off for *Cmp.Conv.Raw.2Dct*

Fig. 13

| Scenario | Occurrence probability 100% Pred. | Parallel | | | Pareto Schedules | | | |
|---|---|---|---|---|---|---|---|---|
| | | Time | Energy | Time(fast) | Energy(fast) | Time(slow) | Energy(slow) | |
| 2Conv.2Cmp | 30% | 14533 | 58 | 9440 | 19 | 15514 | 13 |
| 2Raw. | 20% | 19802 | 41 | 19802 | 41 | 35739 | 32 |
| 2Conv.Dct | 25% | 33403 | 45 | 33403 | 45 | 44511 | 25 |
| 3Conv.Dct | 25% | 22368 | 72 | 22368 | 72 | 50000 | 44 |

Table 6. Scenarios: Occurrence Probability (column 2), Parallel Schedule (column 3-4) and Pareto-schedules (column 5-8)

Fig. 14

|  | | 50000 cycles deadl. | | 10000 cycles deadl. | |
|---|---|---|---|---|---|
| % of known Scenarios | Scheduling Policy | Energy | $N_{violations}$ | Energy | $N_{violations}$ |
| 100% | Parallel | 55212 | 0 | 55864 | all |
| 100% | Scenario | 30341 | 0 | 44789 | 715 |
| 70 % | Parallel | 54229 | 0 | 53475 | all |
| 70 % | Scenario | 36417 | 0 | 44925 | 780 |
| 20 % | Parallel | 53024 | 0 | 50634 | all |
| 20 % | Scenario | 47671 | 0 | 48108 | 935 |

Table 7. Performance Comparison of Scenario-approach and Existing Run-time Schedulling Solutions

Fig. 15

Fig. 16

Algorithm 1 Best-Effort Memory Allocator

1: Design-Time:
2:   for all $T \in$ Task do
3:     for all $ds$ (= data.structure) $\in T$ do
4:       Compute local selfishness:
      $S_{ds}^{local} = N_{ds}^{accesses} \frac{r_{ds}^{misses}}{r_{ds}^{accesses}}$
5:       Add $S_{ds}^{local}$ to $Tab_{info}$
6:     end for
7:   end for
8: Run-Time:
9:   Initialize selfishness of all available banks: $S_{bank} = 0$
10:  Initialize ordered queue $Q$
11:  for all $T \in$ ActiveTasks do
12:    for all $ds \in T$ do
13:      Insert $ds$ in $Q$ according decreasing $S_{ds}^{local}$
14:    end for
15:  end for
16:  while $Q$ is not empty do
17:    $ds$ = head of $Q$
18:    Insert $ds$ in bank with smallest selfishness
19:    Update selfishness of the bank:
      $S_{bank} += S_{ds}^{local}$
20:  end while

Fig. 17

Algorithm 2 Main Flow

Genetic Algorithm:
*Input*: Task set, Deadline
*Output*: Energy Optimal Pareto Point
for all Generations do
    for all Genes in Generation do
        Generate Compatibility Graph (gene)
        Apply List Schedule
        Allocate Data
        Evaluate Fitness of Gene
        Compute Next Generation: Mutation and Cross Over
    end for
end for

Main Flow:
*Input*: Taskset
*Output*: ParetoCurvesforallScenarios
for all Scenarios do
    for all Possible Deadlines do
        Genetic Algorithm(Deadline,Task Set)
    end for
end for

Algorithm 3 List Scheduler
1: Input: Task set, Compatibility Graph (CG)
2: Output: Schedule, List of phases
3: Create a list of all tasks ordered by their estimated execution time: $OL_T$
4: Create the set of all execution phases: $\Phi = \emptyset$
5: Create list of all tasks running in parallel during the current execution phase: $OL_{AT} = \emptyset$ ($AT$ = activetasks)
6: Initialize variables: found = 0; $\tau = 0$
7: while $OL_T \neq \emptyset$ do
8:   for all $task \in OL_T$ do
9:     if isCompatible($task$, $OL_{AT}$, CG) then
10:       AddandUpdatePhases($task$, $\Phi$)
11:       WriteOutput($task$, $\tau$)
12:       insert $task$ in $OL_{AT}$ according Earliest Finish Time
13:       remove $task$ from $OL_T$
14:       found = 1
15:       break
16:     end if
17:   end for
18:   if found = 0 then
19:     finish = pop $OL_{AT}$
20:   end if
21:   $\tau$ = time(finish)
22:   found = 0
23: end while

Fig. 18

Algorithm 4 Scenario-based Run-time Scheduler

Design-Time
Characterize every data structure from each task
Define the most likely scenarios in the application
Generate Pareto Curves for each of those scenarios

Run-Time
if New Task exits/enters the system then
    if corresponding design-time scenario exists then
        Pick the best Pareto Point for that scenario
    else
        Schedule Tasks in Parallel
        Allocate Data according to embodiment of present invention
    end if
end if

Fig. 19

COST-AWARE DESIGN-TIME/RUN-TIME MEMORY MANAGEMENT METHODS AND APPARATUS

RELATED APPLICATIONS

This application is a continuation under 35 U.S.C. §120 of PCT/BE2003/000202 which was published in English, which is incorporated by reference.

FIELD OF THE INVENTION

The present invention relates to methods, apparatus and software products for design-time data-assignment techniques for hierarchical memories, e.g., multi-banked memories in an essentially digital system as well as methods, apparatus and software products for run-time memory management techniques of such a system.

BACKGROUND OF THE TECHNOLOGY

Hierarchical memory systems are known for a variety of essentially digital systems which comprise for example a processor and memory for use with the processor. A conventional system is described in "VLSI memory Chip Design", Kiyoo Itoh, Springer Verlag, 2001, especially chapter 6. A multi-level memory architecture for a personal computer is shown in FIG. 6.1 of this book. It comprises a processor with an on-chip cache memory L1, an off-chip cache memory L2 and a main memory controlled by a memory controller and connected to the processor by a processor bus. In addition, a magnetic hard disc memory is accessible via a system bus and is controlled by a hard disc controller. The level 1 on-chip cache L1 can be SRAM, the level 2 off-chip cache L2 can also be SRAM and the main memory can be DRAM. Since computer programs access a relatively small portion of their address space at any instant, items close to an already accessed item are likely to be accessed in the near future. To take advantage of this spatial locality a cache memory must have a block size larger than one word. However, if the block size is increased too much, the time taken to load the block from a memory in a lower level increases. There is thus a trade-off between block size and the number of levels in the hierarchical memory. One proposed technique to reduce the cache miss penalty is to use a bank of memories and to interleave the words with the banks. This means that if an item is not available from one bank it is likely to be available from another bank, as adjacent banks have adjacent words to the last accessed word.

Hierarchical memories can also be used in embedded applications, as described for instance in "ARM system-on-chip architecture", S. Furber, Addison-Wesley, $2^{nd}$ Ed. 2000, especially chapter 10 on memory hierarchy. In particular, the ARM processors support paging. A page is usually a few kilobytes in size but different architectures have different sizes. Overhead can be reduced by using a look-aside buffer which is a cache of recently accessed page translations. The spatial locality of typical program enables a reasonable buffer size to achieve a low miss rate.

Design-Time Data Assignment Techniques

For embedded systems, P. Panda in "Memory Bank Customization and Assignment in Behavioral Synthesis" *Proc. Iccad*, pages 477-481, October 1999 presents assignment algorithms to improve the performance of SDRAM memories. Both algorithms distribute data with a high temporal locality over different banks. In this way the time/energy penalty of page-misses is minimized. Their optimizations rely on the fact that the temporal locality in a single threaded application is analyzable at design-time. This is not the case in dynamic multi-threaded applications. The temporal locality between tasks depends on their actual schedule which is only known at run-time. This renders the techniques less useful.

The vector and stream processing community has spent much time and effort in researching optimal placement schemes—see, e.g. L. Kurian, "Data Placement Schemes to Reduce Conflicts in Interleaved Memories" Computer Journal, 43(2): 138-151, 2000—to improve the bandwidth of interleaved memories. However, these techniques focus only on performance and do not discuss other cost issues.

V. Delaluz, M. Kandemir, N. Vijaykrishnan, A. Sivasubramaniam, and M. Irwin, present in "Hardware and Software Techniques for Controlling DRAM Power Modes", *IEEE Trans. Computers,* 50(11):1154-1173, November 2001, techniques to reduce the static energy consumption of existing multi-banked SDRAMs in embedded systems. Their strategy consists of clustering data structures which have a large temporal affinity in the same memory bank. A consequence the periods when banks are idle are grouped, thereby creating more opportunities to transition more banks in a deeper low-power mode for a longer time. The impact of this technique on the dynamic energy consumption and the performance is ignored.

Run-Time Memory Management Techniques

A scalable and fast multi-processor memory manager is presented by, e.g. E. Berger, K. McKinley, R. Blumofe, and P. Wilson, in "Hoard: A Scalable Memory Allocator for Multi-threaded Applications", *Proc. 8th Asplos*, October 1998, uses private heaps with a shared memory pool. However, the system is unaware of the cost of the underlying memory architecture.

In a typical application, the data structures which need to be allocated are only known at run-time and fully design-time based solutions as proposed earlier in the compiler and system synthesis cannot solve the problem.

Run-time memory management solutions as present in conventional operating systems are too inefficient in terms of cost optimization (especially energy consumption). They are also not adapted for the real-time constraints.

Low-power design is a key issue for future dynamic multimedia applications mapped on multi-processor platforms. On these architectures multi-banked memories (like e.g. SDRAMs) are big energy consumers. Their dynamic energy consumption is dominant. A crucial parameter which controls the energy consumption of these memories is the number of page-misses.

SUMMARY OF CERTAIN INVENTIVE ASPECTS

There is a need for memory assignment techniques for assigning data to hierarchical memory particularly for multi-tasked applications where data of dynamically created/deleted tasks is allocated at run-time. The energy consumption of hierarchical memories such as multi-banked memories depends largely on how data is assigned to the memory banks.

Aspects of the invention provide methods, apparatus and software products for design-time data-assignment techniques for hierarchical memories, e.g. multi-banked memories in an essentially digital system which improves a cost function such as energy consumption.

Aspects of the invention also provide methods, apparatus and software products for run-time memory management techniques of an essentially digital system.

One aspect of the invention is a method of preparing memory allocation of at least two data structures for at least one task to be executed on a substantially digital system having multi-bank storage, the at least two data structures being accessed by the at least one task, comprising: determining a value of a parameter representing an energy benefit related to accesses required for executing the task for each storing of each of the at least two data structures in one bank alone of the storage, and determining at least one allocation of the at least two data structures to one or more banks in accordance with the determined parameters. This method is primarily a design time method. The method can include storing the at least one allocation, e.g. for use in a target device. The parameter can be a measure of the spatial locality of an access pattern of the data structure when executing the task. The parameter can also be a measure of a temporal locality of accesses to the data structure when executing the task.

The determining of at least one allocation can include minimizing a combination of the values of the parameters per bank. Such a combination includes weighting the parameter in accordance with the size of the data structure and may include supping of the values of the parameter.

The multi-bank storage means may comprise at least at first and a second hierarchical storage level, the first hierarchical level serving as a buffer for the second hierarchical level, and the determining of the value of the parameter includes determining the average time between misses for the first hierarchical level and the average time between accesses to the data structure. The first level may be a page buffer or cache associated with a bank of a multi-bank memory.

A plurality of tasks may be for execution on the substantially digital system having multi-bank storage means, and the method may include determining the value of the parameter representing an energy benefit for each of the data structures for each of the tasks, and minimizing the combination of values of the parameters per bank. The determining of the values of the parameters for the tasks can be performed for a larger set of tasks than for minimizing, which is applied to an active subset only which is to be active when the plurality of tasks is be executed on the substantially digital system. The active subset members are preferably those which will be actually used on the target device.

The method can further comprise: determining the values of the parameter for each of the data structures of each of the at least one task for at least a first and a second number of banks with the multi-bank storage means. For each task and its data structures, allocations can be determined at least for the first number of banks and the second number of banks. The reason for considering several numbers of banks is to consider reducing the number of active banks and by this to save energy by powering down the unused banks.

At run time on the substantially digital system, i.e. on the target device, the method can include selecting either the first or second number of banks for execution of the at least one task. For any of the above methods, for each allocation, run-time execution time information can be stored with the allocation. An example of such information is the expected execution time, e.g. the run-time execution information can be an estimate of the time necessary to execute the at least one task when using the allocation.

From the obtained data allocations a selection can be made that minimizes the energy consumption for executing all tasks, with the constraint that the amount of banks must be less than a predetermined number of banks while satisfying execution timing constraints. The predetermined number of banks can be the number of banks for a target substantially digital device on which the task is to be executed. Satisfying the timing constraints can be determined by comparing the restraint on run time execution time with the run time execution information. Alternatively, the selecting of an allocation for each of the banks can comprise: a selected energy consumption and associated execution time is one combination relating to a plurality of energy consumption-execution time operating points of a predetermined set of optimal energy consumption-execution time operating points. The plurality of energy consumption-execution time operating points can belong to a first trade-off set, wherein for any one combination of energy consumption-execution time for an operating point, all other combinations of energy consumption and execution time for all other operating points in the first trade-off set having a value of the energy consumption which is lower than the value for the one combination, have a value for the execution time which is higher than the value of execution time of the one combination, and all other combinations of energy consumption and execution time for all other operating points in the first trade-off set having a value of the energy consumption which is higher than the value for the one combination, have a value for the execution time which is lower than the value of the execution time for the one combination. The trade-off set can be the to be "Pareto optimised".

A selection of allocations can be made by exploring other aspects of the run-time environment, e.g. a plurality of schedulings of the tasks involved. When there is at least a first and a second task, the determining of the allocations can include selecting for first and second schedulings of the at least first and second task, an allocation which is determined by: a selected allocation for a scheduling has an energy consumption and associated execution time which is one combination of a plurality of energy consumption-execution time operating points of a predetermined set of optimal energy consumption-execution time operating points. The plurality of energy consumption-execution time operating points can belong to a second trade-off set, wherein for any one combination of energy consumption-execution time for an operating point, all other combinations of energy consumption and execution time for all other operating points in the first trade-off set having a value of the energy consumption which is lower than the value for the one combination, have a value for the execution time which is higher than the value of execution time of the one combination, and all other combinations of energy consumption and execution time for all other operating points in the first trade-off set having a value of the energy consumption which is higher than the value for the one combination, have a value for the execution time which is lower than the value of the execution time for the one combination. The second trade-off set may be the to be "Pareto optimised".

Another aspect of the invention includes a method of executing one or more tasks accessing data structures on a substantially digital system having a processor and multi-bank storage means, and a store of memory allocations of the data structures to be accessed, the memory allocations having been determined by any of the memory allocation methods mentioned above and the following:

loading the one or more tasks, accessing the store of memory allocations, and selecting a memory allocation to the multi-bank storage means for one or more data structures accessed by the one or more task in accordance with a trade-off between energy required for accessing the multi-bank storage means and a requirement on the execution time.

A selected energy consumption and associated execution time can be one combination of a plurality of energy consumption-execution time operating points of a predetermined set of optimal energy consumption-execution time operating points. These may be Pareto optimised as defined above.

The method may further comprise storing the schedulings and associated memory allocations, further comprising executing at least a first and a second task in accordance with a scheduling associated with the selected memory allocation.

Yet another aspects of the invention is an operating system for a substantially digital device having a processor and multi-bank storage, the operating system supporting the execution of any of the above run-time memory allocation methods when the operating system is executed on the substantially digital device. The aspect also includes machine readable data carrier having stored thereon software for the operating system.

Yet another aspect of the invention is a computer system adapted to carry out any of the design time methods of the present invention. The aspect also includes a computer system adapted to carry out any of the run-time methods as described.

Yet another aspect of the invention is a substantially digital device having multi-bank memory comprising a number of banks and a processor for executing a task, the multi-bank memory for storing data structure accessed by the task, the number of banks being selected by determining the values of an energy related parameter for each data structure for each of one or more tasks for at least a first and a second number of banks with the multi-bank storage means, and selecting the number of banks based on the parameter.

The device may be any suitable digital device such as a mobile phone, a personal computer, a laptop or palmtop a PDA, an embedded processor and memory on a PCB, or a single chip or multi-chip cached microprocessor.

Yet another aspect of the invention is a design phase and an implementation phase for task scheduling and/or data assignment on hierarchical memories, e.g. multibank memories such as those using SDRAM, which can provide reduced energy consumption. The aspect differs from conventional run-time techniques that are only focused on processor behavior and are not aware of the energy cost of the memory hierarchy. In accordance with an aspect of the present invention design time characterization of data structures can be used at run-time to elaborate a fast and effective task scheduler and data allocator. Algorithms in accordance with inventive aspects are an efficient solution to the energy-aware run-time scheduling problem. The more that heavy tasks appear at run-time, the longer the total execution time and the higher the energy consumption. Therefore, in accordance with another inventive aspect, whenever the occurrence probabilities are changed, the algorithms are redefined.

Embodiments of the invention will now be described with reference to the following tables and figures.

BRIEF DESCRIPTION OF THE FIGURES AND TABLES

List of Figures Showing Embodiments
FIG. 1 shows a Multi-banked SDRAM architecture
FIG. 2 shows extracts from Convolve and Cmp threshold
FIG. 3 shows a Simulation Environment
FIG. 4 shows Different Allocator Strategies for Convolve and Cmp threshold
FIG. 5 shows scheduling outputs for four tasks
FIG. 6 shows a Pareto Curve for four tasks
FIG. 7 shows a Task Independence Graph
FIG. 8 shows an Output of the List Scheduler for four tasks
List of Tables Showing Features of Embodiments
FIG. 9: Table 1 shows Energy Consumption Parameters
FIG. 10: Table 2 shows Energy for Benchmark Tasks @100 MHz
FIG. 11: Table 3 shows Energy Comparison for Different Allocation Strategies
FIG. 12: Table 4 shows a Task set definition
FIG. 13: Table 5 shows Energy/Time Trade-off for Cmp.Conv.Raw.2Dct
FIG. 14: Table 6 shows scenarios: Occurrence Probability (column 2), Parallel Schedule (column 3-4) and Pareto-schedules (column 5-8)
FIG. 15: Table 7 shows Performance Comparison of approaches in accordance with the present invention and Existing Run-time Scheduling Solutions
List of Algorithms Relating to Embodiments
FIGS. 16-19: algorithms 1-4 according to embodiments of the present invention

DETAILED DESCRIPTION OF CERTAIN INVENTIVE EMBODIMENTS

The present invention relates to methods, apparatus and software products for design-time data-assignment techniques for hierarchical memories, e.g. multi-banked memories in an essentially digital system as well as methods, apparatus and software products for run-time memory management techniques of such a system. The target system may be a digital system comprising a processor and a multi-bank memory which can be accessed by the processor when executing a task. One aspect of the present invention can be formalized as a method and apparatus for cost-optimal assigning for an essentially digital system which comprises storage means with at least two hierarchical levels (i.e. a multi-level memory). The method comprises determining at run-time a cost-optimal assignment of data groupings to the storage means, by selecting from a plurality of assignments, determined at design-time by loading code describing of at least one application to be executed on the system; and executing a method for determining data groupings. The storage means can be characterized in that loading data (content) from a second level into a first level is higher than the reading data (content) from the first level. The storage means can have as second hierarchical level a plurality of storage parts or banks. The design-time assignments can have a different cost and constraint. The run-time selection of memory allocation depends on the run-time context and constraints.

In a further aspect of the present invention a method and apparatus for cost-optimal assigning of data groupings to a storage device that has a plurality of banks is provided. The banks can load parts of their data content into a plurality of buffers (assigned to the the storage device), i.e. the memory is a hierarchical memory with at least two levels: buffers and banks. The cost of loading data from the bank to one of the buffers is higher than the cost of reading one data word from the buffer. The method comprises determining at design-time at least two possible memory assignments with different cost versus constraint trade-offs and using these design-time assignments to select a cost-optimal one at run-time depending on the run-time context and constraints.

A flow for one aspect of the present invention is:

Load task (application information) onto a simulation environment

Load amount of banks (device memory organization information)

For at least one task
    For the data structure of the task
    Determine Energy Benefit parameter
    Assign all data structures of the task to the banks
    While minimizing criteria per bank.

The energy benefit parameter may be a measure of the spatial locality of an access pattern of a data structure when executing the task, e.g. a selfishness parameter. The algorithm may be implemented in software on a suitable design platform, e.g. a workstation.

A further flow for an aspect of the present invention when executed in a simulation environment is:
Load application
Load amount of banks (device memory organization information)
For all tasks of the application
    for the data structure of the task
    Determine Energy Benefit parameter
For various possible active subsets of tasks
    Assigning all data structures of these tasks to the banks
    While minimizing criteria per bank
    Store the assignments.

The energy benefit parameter may be a measure of the spatial locality of an access pattern of a data structure when executing the task, e.g. a selfishness parameter. The stored assignments may be used at run time on an essentially digital system to select a suitable assignment for the active tasks accessing data structures at run time.

A further flow of another aspect for execution on a suitable simulation environment is:
Load application
Load amount of banks (device memory organization information)
For all tasks of the application
    for the data structure of the task
    Determine Energy Benefit parameter
For various possible active subsets of tasks
    For a varying amount of banks used
    Assigning all data structures of these tasks to the banks
    While minimizing criteria per bank
    Store the assignments including run-time information.

The energy benefit parameter may be a measure of the spatial locality of an access pattern of a data structure when executing the task, e.g. a selfishness parameter. The stored assignments may be used at run time on an essentially digital system to select a suitable assignment for the active tasks accessing data structures at run time.

Still a further flow of an aspect of the present invention is:
Load application
Load amount of banks (device memory organization information)
For all tasks of the application
    for the data structure of the task
    Determine Energy Benefit parameter
For various possible active subsets of tasks
    For different schedules of the task
    For a varying amount of banks used
        Assigning all data structures of these tasks to banks
        While minimizing criteria per bank
    Store the assignments including run-time information.

The energy benefit parameter may be a measure of the spatial locality of an access pattern of a data structure when executing the task, e.g. a selfishness parameter. The stored assignments may be used at run time on an essentially digital system to select a suitable assignment for the active tasks accessing data structures at run time.

Advantages of these methods and apparatus can be at least one of:

1. The design-time/run-time approach can be used to reduce the implementation (e.g. memory area) or execution cost (e.g. energy cost) of an application running on a computing platform.
2. The design-time/run-time data-assignment can be implemented with a heuristic parameter which characterizes the execution cost benefits of storing a data structure in a partition of the memory (e.g. in an SDRAM-bank) alone. At design-time for each data structure the value of this heuristic parameter is defined/measured. At run-time, a dynamic memory manager uses the heuristic parameters of all the active data structures to find the most execution cost-efficient data-assignment.
2(a) One implementation of the heuristic parameter is which will be called "Selfishness". Selfishness is a measurement of the spatial locality of the accesses of the tasks to the data structure, weighted with the relative importance of the data structure compared to all the data structures in the task. For instance, Selfishness of a data structure may be defined as the product of the number of accesses to that data structure multiplied with the average time between buffer-misses divided by the average time between accesses, when the data structures is stored in a bank alone.
2(b) One implementation of the run-time manager distributes the active data structures across the banks is cost optimized, e.g. such that the sum of the selfishness of the data structures assigned to each bank is balanced as much as possible.
3. The design-time/run-time data-assignment methodology can be implemented by generating at design-time for each task a set of possible data-assignments. In each data assignment the data structures of a the task are assigned to a specific number of partitions. Only the data assignments which are most execution-cost-efficient for a given number of banks are retained. The total number of data assignments per task is equal/smaller than the available number of banks in the system. The generated data assignments for a task can be presented in a Pareto-curve trading off number of banks versus a specific cost associated with the execution. At run-time, given a set of active tasks and a number of available memory banks, a run-time manager selects a data assignment from the design-time generated Pareto-sets of the parallel executing tasks constrained to the available banks on the system such that the execution cost of the application is minimized.
4. The data-assignment methodology can be combined with task-scheduling. In this context, a task is a control data-flow graph where the nodes represent sets of data-context, and the edges represent either data or control dependencies between the nodes. At run-time new tasks can be added to the running(active) task-set on the platform. Similarly, active tasks can be removed from the active task-set. Task-scheduling defines a (partial) execution order the nodes of all the active tasks in the application. Task-scheduling changes which nodes execute in parallel and consequently, which data structures are active at the same time and changes how these data structures are accessed by different sets of parallel executing tasks. Some of the combinations of nodes and thus data structures are more execution cost-efficient than others.
4(a) A design-time/run-time task-scheduler can be implemented by generating at design-time for each task independently a set of execution cost/time optimal task-schedules and data-assignments. These schedules and data-assignments can be presented in a Pareto-curve trading off execution-cost/time. Each point on the Pareto-curve is thus a possible operating point for a task. The run-time manager using these Pareto-curves to find the most execution cost-efficient task-schedule for all the tasks which need to be executed in parallel. The run-time manager combines the most execution-cost/time optimal operating points of the tasks constrained to the time-limitations imposed on the tasks. In this approach the different tasks are executed one after the other.

4(b) A design-time/run-time task-scheduler can be implemented by generating Pareto-curves for inter-task scenarios. An inter-task scenario is a set of tasks which can be executed in parallel in the application. Either inter-tasks scenarios are derived for all the possible sets of tasks which can execute in parallel or scenarios are only derived for the most frequently occurring parallel executed sets of tasks. Which task-sets can be co-executed can be determined by measurement, program-analysis or can be annotated explicitly by the programmer. At design-time, for each scenario a set of execution-cost/time optimal task-schedules and data-assignment is derived. These task-schedules can be represented in a Pareto-curve. At run-time, when a new tasks enters/exists the system, the run-time manager identifies which inter-task scenario is active and selects the most execution-cost efficient operating point in the corresponding Pareto-curve which satisfies the time-constraints. Thereafter, the run-time manager adapts the task-schedule and data-assignment to the newly selected operating point of the scenario. When no scenario is defined, the run-time manager falls back on an existing task-scheduler.

4(c) A design-time/run-time task-scheduler can use intra-task scenarios. Data-dependencies in the task vary at run-time its execution behavior and thus its memory access pattern seen by the memory subsystem. To cope with this dynamic variation, intra-task scenarios are defined. An intra-task scenario is a set of parameters which define completely or partially the run-time behavior of the task. The parameters are known at the start of the task. The intra-task scenarios can be derived at design-time by measurement, program analysis or can be explicitly annotated by the programmer. The intra-task scenarios can be exploited by any of the above mentioned run-time managers. At design-time, either per task or per inter-task scenario a set of execution-cost/time optimal task-schedules and data-assignments is derived.

For example, at run-time, when a new tasks enters/exists the system, the run-time manager identifies which scenario is active and selects the most execution-cost efficient operating point which satisfies the time-constraints. Thereafter, the run-time manager adapts the task-schedule and data-assignment to the newly selected operating point of the scenario. When no scenario is defined, the run-time manager falls back on an existing task-scheduler.

Alternatively, at run-time the run-time manager combines the most execution-cost/time optimal operating points of the tasks constrained to the time-limitations imposed on the tasks such that an execution cost is minimized.

5. With the design-time/run-time methodology time-constraints (deadlines) of applications can be met at run-time. At design time, more than one operating point can be generated for each task-set in the application. Each operating point corresponds to a data-assignment and/or task-schedule and/or the operational settings of the memory (e.g. execution state, number of alive banks, i.e. banks which have been powered up). A different execution time corresponds with each the generated operating point. At run-time, a run-time manager selects the operating point of a task-set such that the time-constraints are met.

6. The data-assignment methodology can be used both in absence or presence of an intermediate memory hierarchy layer.

Memory Allocation for Dynamic MultiMedia Applications (as an Example)

Low-cost, portable consumer devices which integrate multi-media and wireless technology are a desirable commodity. Applications running on these devices require an enormous computational performance (1-40 GPS) at a low energy consumption (0.1-2 W). Additionally, they are subjected to time constraints, complicating their design considerably. The challenge to embed these applications on portable devices is enlarged even further because of user interaction. E.g., at any moment the user will be able to trigger new services, change the configuration of the currently running services or to stop existing services. Heterogeneous multi-processor platforms can offer enough computational performance at a sufficiently low energy consumption. To store multimedia data these platforms need to be connected to large off-chip multi-banked memories (e.g. today SDRAM memories). They contribute significantly to the system's energy consumption. The energy consumption of multi-banked memories depends largely on how data is assigned to the memory banks. The present invention provides assignment techniques to solve the assignment problem for multi-tasked applications where data of dynamically created/deleted tasks is allocated at run-time.

The inventive embodiments relate to memory allocation, in particular for multi-task applications, running on multibank memory architectures. They are is particularly suited to optimize the multi-task application, or equivalently the substantially simultaneous execution of multiple single task applications, involving the access of various data structures, each of the tasks having at least one. Memory allocation is the step of determining which data is stored in which bank in order to optimize certain criteria. The memory allocation approach of the invention has as intent to decrease the energy consumption needed for accessing such data. In a first method for at least one task the data structures accessed by the tasks are assigned a parameter expressing the energy benefits of storing such data structure in a bank alone. The assignment of the data structures is then performed such that the sum of the parameters of the data structures per bank is minimized. In a further embodiment, the parameter is a measure of the spatial locality of the data structure. In a further embodiment, the parameter is based on the average time between page-misses and the average time between accesses. In an embodiment, the parameter is weighted with the importance of the data structure.

In a second method the above approach is performed for a plurality of tasks. Hence, again the parameter of each of the data structures of each of the tasks is performed and the minimizing of the sum of the parameters per bank.

In an embodiment thereof, the determining of parameters for the tasks is performed for a larger set of tasks than for the step of minimizing, which is applied to an active subset only.

In a third method, the second method is applied for each of the data structures of a task for a varying number of banks within the memory architectures. Hence for each task for its data structures an assignment is determined at least for a first number of banks and a second number of banks. Further for each such assignment the run-time information (the information on the time necessary to executed a task with such data assignment) is added.

In another embodiment, from the obtained data assignments a selection is made, minimizing the energy consumption for executing all tasks, with the constraint that the amount of banks must be less than a predetermined amount of banks (the amount available within the memory architecture) while satisfying timing contraints (by comparing the run-time information). In a fourth method the above methods are used while extending the degrees of freedom, in particular by exploring various schedulings of the tasks involved.

In embodiments of the present invention, two implementations of Energy-aware memory allocators for dynamic multi-tasked applications are provided. The energy gains of both allocators have been confirmed by experimental results obtained with a multi-processor simulator. The results are based on realistic task-sets. They indicate that both allocators significantly reduce the energy consumption compared with the best known conventional approach. The performance of both allocators is evaluated using an existing multi-banked memory (i.e. an SDRAM). However, the method is not limited to SDRAMs, but can be applied to the broad class of memories described in the claims.

Platform and SDRAM Energy Model

In the context of the experiments, a platform is assumed that consists of a set of processor nodes. Each processor is connected to a local memory and interacts with shared multi-banked (partitioned) memory module, in casu an off-chip SDRAM modules. The SDRAMs are used to store data structures which can be large data structures (e.g. audio, video or image data).

A simplified view of a typical multi-banked SDRAM architecture is shown in FIG. 1. It comprises a hierarchical memory 1 with a page buffer 2 associated with a memory bank 4. The page buffer 2 and the memory bank 4 are read/written via row decoders 6, 12 and column decoders 8, 10 respectively. The input/output of the hierarchical memory 1 is provided via an input/output register 14. Although one bank is shown, a multibank memory includes two or more such banks, each with its associated page buffer. Not shown is a memory controller which controls the use of the hierarchical memory 1.

Fetching or storing data in an SDRAM involves three memory operations. An activation operation decodes the row address, selects the appropriate bank 4 and moves a page/row to the page buffer 2 of the corresponding bank. After a page is opened, a read/write operation moves data to/from the output pins of the SDRAM. Only one bank can use the output pins at one time. When the next read/write accesses hit in the same page, a memory controller does not need to activate the page again (a page hit). However, when another page is needed (a page miss), precharging the bank is needed first. Only thereafter can the new page be activated and the data can be read. Similar to processor cores, SDRAMs nowadays support several energy states in which the SDRAM can be used. Three energy states can be identified: standby mode (STBY), clock-suspend mode (CS) and power down (PWDN). Switching between the different energy states comes at a transition time penalty. However, powering down can reduce energy consumption. It is assumed that the energy states of each bank can be controlled independently. The timing behavior of the SDRAM memory can be modeled with a state-machine. The timing parameters of the different state transitions have been derived, for example, from a real SDRAM memory or any other memory or from a proposed or prototype memory. The energy consumption of the SDRAM is computed with the following formula:

$$E = \sum_{\forall i=1}^{N_{banks}} (E_{static}^i + E_{dynamic}^i)$$

$$E_{static}^i = P_{cs} \cdot t_{cs}^i + P_{stby} \cdot t_{stby}^i + P_{pwdn} \cdot t_{pwdn}^i$$

$$E_{dynamic}^i = N_{pa}^i \cdot E_{pa} + N_{rw}^i \cdot E_{rw}$$

Where:
$N_{banks}$ represents the number of banks
$E^i_{static}$ represents the static energy consumption for bank i, that is the energy required to energize the bank i ready for accesses
$E^i_{dynamic}$ represents the dynamic energy consumption for bank i, that is the energy required to make the accesses to the bank i
$P_{cs}$ represents the power consumption to maintain a bank in the state CS
$P_{stby}$ represents the power consumption to maintain a bank in the state STBY
$P_{pwdn}$ represents the power consumption to maintain a bank in the state PWDN
$t^i_{cs}$ represents the time that the bank i is in the state CS
$t^i_{stby}$ represents the time that the bank i is in the state STBY
$t^i_{pwdn}$ represents the time that the bank i is in the state PWDN
$E_{pa}$ represents the energy of a precharge/activation
$E_{rw}$ represents the energy of a read/write
$N^i_{pa}$ represents the number of precharge and activation operations in bank I
$N^i_{rw}$ represents the number of reads and writes in bank i.

This model decomposes the energy consumption into a static and a dynamic part. The static energy consumption is the standby power of the banks, e.g. SDRAM. It depends on which energy states are used during execution. A energy state manager controls when the banks should transition to another power state. More in particular, the memory controller traces the idle time of each bank. As soon as the bank idles for more than one cycle, the manager switches the bank to the CS-mode. When the bank is needed again it is switched back to STBY-mode, preferably within a cycle. Finally, a bank can be switched off as soon as it remains idle for longer than a certain time or a certain number of cycles, e.g. 1 000 000 cycles. The dynamic energy consumption depends on which operations are needed to fetch/store the data from/into the memory. The energy parameters are presented in Table 1. The remaining parameters) are obtained by simulation.

According to experiments carried out, on a multi-processor architecture the dynamic energy contributes on an average a majority, that is about 68%, of the total energy consumption of an SDRAM. The remaining static energy is usually not dominant because the SDRAM is shared by multiple tasks. As a consequence, it is more actively used compared to uni-processor architectures and it consumes less static energy waiting between consecutive accesses. Moreover, even though in future technologies leakage energy is likely to increase, many techniques (at the technology, circuit and memory architecture level) are under development by DRAM manufactures to reduce the static energy consumption. Also existing hardware power state controllers can significantly decrease the static energy.

In one aspect of the present invention methods apparatus and software are provided for data assignment techniques to reduce the dynamic energy. In embodiments of the present invention the choice of data assignments in a hierarchical memory, e.g. among a multi-bank memory, can significantly reduce the number of page-misses, thereby saving dynamic energy. A small task-set is used by way of example which consists of two parallel executing tasks, Convolve and Cmp threshold. The code of both tasks is presented in FIG. 2. Page-misses occur when e.g. kernel and imgin of Convolve are assigned to the same bank. Each consecutive access evicts the open-page of the previous one, causing a page-miss ($2.K^2$-misses in total). Similarly, when data of different tasks are mapped to the same bank, (e.g. kernel of Convolve and img1 of Cmp threshold), each access to the bank potentially causes a page-miss. The number of page-misses depends on how the accesses to the data structures are interleaved. When imgin and imgout are mapped in the same bank, an access to imgout is only scheduled after $K^2$ accesses to imgin. Therefore, the frequency at which accesses to both data structures interfere is much lower than for kernel and imgin. The resulting number of page-misses in this case is only two. The energy benefit of storing a data structure alone in a bank depends on how much spatial locality exists in the access pattern to the data structure. E.g. kernel is a small data structure (it can be mapped on a single page) which is characterized by a large spatial locality. When kernel is stored in a bank alone, only one page-miss occurs for all accesses to it. From this, a data assignment should (1) separate the most important data structures with a large spatial locality from the other data structures, since this results in large energy savings; (2) the remaining data structures should be shared in such a way that the number of page-misses is minimized.

The assignment problem can be complicated by the dynamic behavior of modern multimedia applications. Tasks and data are allocated and deleted at run-time due to interaction of the application with its environment. Hence, only at run-time is it known which tasks are executing in parallel and which data needs to be allocated in the memory. A fully static assignment of the data structures to the memory banks is thus not optimal. Dynamic memory allocators are a potential solution. However existing allocators are unaware of the underlying memory architecture. They do not take the specific behavior of SDRAM memories into account to reduce the number of page-misses.

To solve the above issues embodiments of the present invention provide two dynamic memory allocators which reduce the number of page-misses. The first, a besteffort allocator shares the SDRAM banks between the tasks. It uses a heuristic parameter, selfishness to steer the data assignment. However, it need not guarantee time-constraints due to page-interference. Therefore, when hard real-timeness is an issue, banks should not be shared among tasks. The number of page-misses can still be reduced by cost-efficiently distributing the available banks to the tasks. This is the main idea behind the second embodiment, the guaranteed performance memory allocator.

Bank Aware Allocation Algorithms

A first embodiment of the present invention provides a best effort memory allocator (BE) which searches the most energy-efficient assignment for all the data in a task-set. The allocator can map data of different tasks in the same bank in order to minimize the number of page-misses. Hence, accesses from different tasks can interleave at run-time, causing unpredictable page-misses. There is no way of knowing exactly how much the page misses will increase the execution-time of the tasks. As a consequence, the best effort allocator may be less than optimal when hard real-time constraints need to be guaranteed and little slack is available. The goal of the second allocator, the guaranteed performance allocator (GP) is to minimize the number of page-misses while still guaranteeing the real-time constraints.

Best Effort Memory Allocator

The algorithm is given in Algorithm 1 for execution in simulation environment. It consists of a design-time and a run-time phase, each of which is a separate aspect of this embodiment. The design-time phase bounds the exploration space of the run-time manager reducing its time and energy penalty. At design-time (line 1-7) the data structures of each task are characterized with a heuristical parameter: selfishness (line 4: $S_{ds}^{local}$). Selfishness expresses the energy benefits of storing data alone in a bank. When accesses to a selfish data structure are not interleaved with accesses to other data structures in the same bank, page-misses are avoided. Selfishness of a data structure is calculated by dividing the average time between page-misses ($\tau_{ds}^{misses}$) by the average time between accesses ($\tau_{ds}^{accesses}$). This ratio is a measure of the available spatial locality and can be calculated at design-time. It can be weighted with the importance of the data structure. This can be done, for example, by multiplying the ratio by a parameter which represents the importance of the datastructure to the energy consumption, e.g. the number of accesses to the data structure ($N_{ds}^{accesses}$). Finally, extra data structures are added to the source code for the design-time information needed at run-time (line 5: $Tab_{info}$).

At run-time (line 8-20) on an essentially digital system comprising a processor and a hierarchical memory, e.g. a multibank memory, when it is known which tasks are activated at the start of a new frame and thus which data needs to be allocated, the algorithm assigns the alive data to the memory banks. The run-time algorithm may be included in an operating system for the essentially digital system. For example, the source code for operating system known as "LINUX" may be modified to carry out the algorithm and then be re-compiled for the relevant processor. An example of a processor is an ARM processor—see the book by Furber. Alternatively, a run time operating system may be used which makes use of an existing operating system and makes calls to and from the existing operating system. The algorithm assumes that tasks can only be started/deleted at predefined points in the program. However, this is not a severe limitation for most modern multi-media applications. The algorithm distributes the data among the banks such that selfishness of all the banks is balanced. The selfishness of a bank ($S_{bank}$) is the sum of the selfishness of all data structures in the bank. The algorithm ranks the data structures according to decreasing selfishness (line 11-15) and then greedily assigns the data to the banks starting from the most selfish one (lines: 15-20). Each data structure is put in the least selfish bank. This strategy puts the most selfish data structures in separate banks and clusters the remaining ones such that the number of page-misses is minimized. The complexity of the run-time phase is linear with the number of data structures in the task-set.

Guaranteed Performance Allocation

The time guarantees are only possible when no unpredictable page-misses occur as a result of interference between tasks. One way to avoid interference is to assign the data of simultaneously active tasks to independent banks. This implies that at least one bank per task is required or extra task scheduling constraints need to be introduced. The following two degrees of freedom remain: how to partition the banks among the tasks and how to assign the data of each task to its partition. The number of page-misses of a task heavily depends on the number of banks which are assigned to it (e.g.

see tasks in Tab. 2). The sensitivity of the number of page-misses to the number of banks varies from task to task. Some tasks benefit more from having extra banks assigned to it than others. The second embodiment of the present invention provides a guaranteed performance algorithm which allocates more banks to those tasks which benefit most.

At design-time, the algorithm generates a data assignment for every task and for any possible (available or planned or potential) number of banks. The resulting assignments for each task can be presented in trade-off, e.g. in a Pareto curve which trades off the energy consumption of the task in function of the number of banks. With each point in the curve thus corresponds an assignment, the number of banks required for the assignment and the energy consumption of the assignment. Each point is annotated with the run-time of the task executed according to the corresponding assignment.

The Pareto curves can be created with the best-effort algorithm based on selfishness. The approach consists then of assigning the data of a single task to the SDRAM banks. In this case no run-time information about other tasks is required. As a consequence, at design-time the selfishness of all data structures can be computed and the final data assignment can be generated based on these computations.

The design time algorithm can be implemented in software application for example, running on a workstation.

At run-time, the algorithm distributes the available banks of the platform among the active tasks using the Pareto curves. The algorithm selects a point on the Pareto curve of each task such that the energy consumption of all tasks is minimized and that the total number of banks for all tasks is less or equals the available number of banks on the platform. In the context of task-scheduling, a further aspect of this embodiment provides a greedy heuristic which finds a near optimal solution in linear time. The execution time of a task-set can be calculated by taking the maximum of the run-times of all tasks within the task-set.

The run-time algorithm may be included in an operating system for the essentially digital system. For example, the source code for operating system known as "LINUX" may be modified to carry out the algorithm and then be re-compiled for the relevant processor. An example of a processor is an ARM processor—see the book by Furber. Alternatively, a run time operating system may be used which makes use of an existing operating system and makes calls to and from the existing operating system.

Evaluation Strategy

The main goal of the simulation environment represented schematically in FIG. 3 is to study how multi-threaded applications should be mapped on a shared memory hierarchy. The processing elements and the memory architecture are simulated independently. This allows quick exploration of different allocations of the data structures on the hierarchical memory, e.g. on e the SDRAM memories, while avoiding long simulation times for the processing elements. The processing elements and their performance are simulated using an adapted instruction set simulator. The simulator may be implemented as a software program running on a workstation. This simulator dumps a memory access trace for each task in the parallel application. Each memory access in the trace is annotated with its relative issue-time. The memory traces are input together with the schedule of the corresponding tasks in the performance and energy evaluation script. This script combines the memory access traces in a cycle-accurate way according to the issue-time of each access, the task schedule and the configured memory hierarchy. It outputs the total execution time of each task (including both the processor and memory delay) and the energy consumption of the memory hierarchy.

To evaluate the effectiveness of the assignment techniques in accordance with the embodiments of the present invention, representative task-sets have been generated. In Table 2 these tasks are enumerated. Table 2 shows their total energy consumption in function of the number of memory banks. The table contains measurements for the tasks executed on a instruction set simulator running on a processor at 100 MHz. The results for this analysis were obtained with assignments based on the BE-approach.

Experimental Results

The optimal nature of the embodiments of the present invention: best-effort BE and guaranteed performance GP has been verified against a Monte-Carlo approximation of the best-possible assignment (MA). The results of the latter were obtained by measuring 100 different data assignments. The memory allocators in accordance with the present invention were compared with three known policies. The first reference policy, random allocation (RA) randomly distributes the data structures across the memory banks and is similar to architecture-unaware allocators. The average energy consumption is shown after 100 runs of the RA policy. In the second reference the SDRAMs are not shared among the processors. Each processor owns an equal number of memory banks. On each processor a local memory allocator manages the private banks (sequential allocation SA). Finally, results obtained with embodiments of the present invention are compared a static energy reduction technique. This technique clusters the data structures such that the number of active banks is minimized. In the most extreme case, all data is clustered in a single bank (clustered allocation CA).

In FIG. 4 the energy consumption of the different allocators for the Convolve and Cmp threshold task-set is shown. Note that the SA and GP curves only start from two banks, which is the minimum number of banks needed by these policies. Similar results for other tasks-sets are presented in Table 3. The energy consumption of all allocators, except for CA and SA, first decreases when the number of banks is increased. The allocators distribute the data across more banks, thereby reducing the number of page-misses and the dynamic energy. At the same time, the static energy consumption slightly reduces since less misses results in a shorter execution time (see the static energy of the example in FIG. 4 executed at 600 MHz.). However, when extra banks do not significantly reduce the page-miss rate anymore, the dynamic energy savings become smaller than the extra static energy needed to keep the banks in CS/STBY-mode. The total energy consumption increases then again. A nice illustration of this is Quick24 to 8 in Table 2. The total energy consumption decreases up to three banks and then increases again due to the extra static energy. Also, in FIG. 4 the total energy consumption increases again when more than five banks are used. From these examples, it can be see that an optimal number of active banks can exist. The optimal number of banks depends on the ratio of static to dynamic energy. When the banks become more active (e.g. because more tasks are activated or the processor frequency is increased), the dynamic energy becomes more important than the static energy and the optimal number of banks increases. E.g. in FIG. 4 the optimal number of banks increases from five to six when the processor frequency changes from 100 MHz to 600MHz.

CA clusters the data in as few banks as possible to limit the static energy of memories, but it comes at the cost of extra page-misses and thus more dynamic energy. Therefore, CA increases the total energy consumption when the energy is dominated by the dynamic energy (see FIG. 4).

SA also performs poorly under these conditions. It cannot exploit idle banks owned by other processors to reduce the number of page-misses. The difference between SA and MA (an approximation of the best-possible assignment) is large: more than 300% for the Rgb2Yuv/Cmp threshold task-set with 6 banks, indicating that sharing SDRAM memories is an interesting option for heterogeneous multi-processor platforms. It increases the exploration space such that better assignments can be found. When the banks are not too heavily used, there is even no performance penalty (see below).

It can be observed in FIG. 4 that existing multi-processor memory allocators (RA) perform badly compared to MA. This suggests that a large headroom for improvement exists. When only one bank is available, obviously all memory allocation algorithms produce the same results. With an increasing number of banks the gap between RA and MA first widens as a result of the larger assignment Freedom; e.g. up to 55 % for Rgb2Yuv and Cmp threshold with four banks. However, the performance of the RA improves with an increasing number of banks: the chances increase that RA distributes the data structures across the banks which significantly reduces the energy consumption. Therefore, when the number of banks becomes large the gap between RA and MA becomes smaller again, e.g. 50% for Rgb2Yuv and Cmp threshold with six banks. For higher processor frequencies the static energy consumption decreases and the potential gains become larger. E.g. for Convolve and Cmp threshold the gap increases from 26% to 34%.

FIG. 4 shows how BE (in accordance with the present invention) outperforms RA. Results at the top part of Table 3 suggest an improvement up to 50% (see Rgb2Yuv and Cmp threshold with four banks). Moreover, BE often comes close to the MA results. The difference between BE and MA is always less than 23%. When the number of tasks in the application becomes large (see last task-set in Table 3 which consists of 10 tasks), a small energy loss of BE compared to RA for the first task-set is noted when eight banks are used. In this case 50 data structures are allocated in a small amount of banks. As a result, a limited freedom exists to reduce the number of page-misses, i.e. the energy gap between maximum and minimum energy consumption is small. Note that BE cannot detect the optimal number of banks.

When the banks are not actively used, the energy consumption increases (compare e.g. Cmp threshold and Convolve for five and six banks), but it remains lower than conventional dynamic allocation policies.

GP performs equally well for a sufficiently large number of banks. The main advantage of this technique is that the execution times of the different tasks can be predicted and guaranteed. Moreover, it will never use more than the optimal number of banks, but its performance breaks down when only few banks are available per task. In this case, it maps (similar to SA) all data structures of each task in a single (or few) banks. It then consumes more energy than RA (29% for Convolve and Cmp threshold with two banks).

From the above it can be appreciated that the present invention provides two dynamic memory allocators: a best-effort and a guaranteed performance allocator. Both allocators assign the arrays of dynamically created/deleted tasks to the memory banks, thereby reducing the number of page-misses and thus the energy consumption. The allocators significantly reduce the energy consumption of SDRAMs compared to existing dynamic memory managers.

EnergyAware Scheduling for Dynamic MultiMedia Applications on MultiProcessor Platforms Heterogeneous multi-processor platforms potentially offer enough computational performance at a sufficiently low energy consumption, on condition that the applications are intelligently mapped on them. A crucial step during the application-to-platform mapping is task-scheduling. Task scheduling has been investigated a great deal in the last decades. The emphasis of most prior research has been on how scheduling can be used to improve the performance of a multi-tasked application. However, nowadays energy consumption has become a main bottleneck in today's systems. If energy is considered at all in task-scheduling, the focus has been on the processing cores and not on the equally (or more) important memory system. From published results, it is known that a very important percentage of the power consumed in a device such as a handheld PDA is dissipated in the memory system (up to 40-50% in some multi-media applications). The existing scheduling techniques have no positive effect on the energy consumption of the memory system which needs to operate at a fixed operating voltage internally due to circuit reasons.

Large off-chip SDRAMs, which are used to store multi-media data, consume a large part of the energy in the memory system. As shown above, a good allocation of the different data structures across the banks of a multi-banked memory significantly reduces its energy consumption. The energy savings are based on the reduction of page-misses, caused by the interferences between the different access patterns of the data structures. In accordance with a further embodiment of the present invention task scheduling is used to influence the number of those interferences. With a good combination of task scheduling and data allocation more energy savings can be obtained. The results indicate that there is a trade-off between performance and energy consumption, depending on the task scheduling for a fixed data allocation policy.

In accordance with a further embodiment of the present invention a genetic algorithm is presented to explore this trade-off at design-time. The design time method according to this embodiment may be carried out on a personal computer or a workstation running software to carry out this method. Results are shown of this algorithm it is indicated how this trade-off can be exploited at run-time to deal with the dynamic behavior of multi-media applications in accordance with a further embodiment of the present invention.

The run-time aspect of this embodiment is carried out on a target essentially digital system such as a processor with a multibank memory. The processor may be an ARM processor core, for example (see book by Furber). AN operating system, such as the LINUX operating system is adapted to carry out the run-time aspects of this embodiment. The source code of LINUX operating system is available and is modified and then re-compiled for the relevant processor. In accordance with an aspect of the present invention, a set of energy-optimal implementations are generated for the most common task-sets (scenarios). At run-time, as soon as the task-set changes, a best fitting design-time implementation is selected for the newly activated task-set. With this combined design-time/run-time scheduling approach, energy savings of up to 60% can be obtained for a hierarchical memory, e.g. for an SDRAM memory subsystem, while reducing the number of deadline violations up to 30% compared to conventional memory-unaware approaches.

EXAMPLE

In computing systems sharing resources is always a source of conflicts. Several processors accessing a shared multi-banked memory generate bus conflicts and page-misses, increasing both the energy consumption and the execution time. Task scheduling should be aware of all these potential conflicts, and, combined with an energy-aware data allocator, try to find the best way to minimize the energy cost. According to experiment, on a multi-processor architecture with current SDRAMs (like the one of Micron) the dynamic energy contributes on an average 68% to the total consumption of an SDRAM.

Even though in future technologies the basic leakage energy is likely to increase, many techniques (at the technology, circuit and memory architecture level) are under development by DRAM manufacturers to reduce the static energy consumption below the current 32%. The present invention therefore has a first aim to reduce the dynamic energy.

Page-misses are the main source of dynamic energy consumption in multi-banked memories (e.g. SDRAMs). They can be avoided by ensuring that consecutive accesses to a memory bank hit in the same page. The data-to-bank assignment directly influences the access order seen by each memory bank, and thus the number of page-misses. By storing spatial local data structures in banks alone, a large number of page-misses can be avoided. Since the number of banks is limited, a careful decision is necessary which data structures benefit most from being stored alone in a bank. This decision depends on several factors: the number of accesses, the time between accesses and the spatial locality that exists in the access pattern of the data structure. Based on these three parameters, a heuristic can be built to steer the data allocation process as indicated above. Since the set of tasks which is executing in parallel is only known at run-time, the assignment decisions can not be taken at design-time. Dynamic memory allocators are then a potential solution.

However, when the ratio number of data structures-to-number of banks becomes high, insufficient banks are available to separate all energy critical data structures from each other. Data allocation alone does not suffice to decrease the number of page-misses. In such a situation, task scheduling is a good way to enlarge the freedom of the allocation process. It allows to trade-off execution time with energy consumption needed to execute the task set.

A small example will justify this trade-off and how the trade-off can be used during run-time scheduling. A task-set is used which consists of four independent small tasks. The number of data structures ($N_{ds}$) used by each task, the energy consumption of the SDRAM and execution time of the tasks are presented in Table 4. These numbers are obtained by executing each task independently of the others, and with the data allocation policy for the banks as explained above for the first two embodiments.

Generally, sequential schedules result in the lowest energy consumption but they have the worst execution time. In a sequential schedule the number of data structures/number of banks remains low, offering the largest freedom to allocate the data structures across the banks. Although the execution time increases and thus also its static energy consumption, this cost is usually largely compensated by the dynamic energy savings. A (partially) parallel schedule in contrast results in the shortest execution time, however, at the expense of a (much) higher energy cost. This is the case for the tasks in the small example. In FIG. 5 time and SDRAM energy consumption values are shown for four schedules. The trend can be easily seen: the higher the execution time, the lower the energy consumption becomes. Of course, some schedules do not follow this tendency, but they nned not be taken into account because they are not optimal points for energy cost nor for execution time. Schedule D in FIG. 5 corresponds to sequential scheduling: the longest execution time with the lowest energy consumption. Parallel scheduling corresponds with part A of the figure, following the expected behavior. B and C are intermediate solution schedules that can be picked up at run time if suitable.

A Pareto trade-off curve of all possible schedules is shown in FIG. 6. FIG. 5 also indicates that the execution time of a task cannot be estimated independent of other tasks running on the platform. The time penalty arising from sharing the SDRAM between several concurrent tasks reaches up to 300% for CMP (in schedule A), compared to its execution time without other tasks executing on the platform (CMP in schedule B). In accordance with an aspect of the present invention these Pareto-curves are generated using a simple genetic algorithm (see below).

Exploration Methodology

In most real-time applications, execution progress is periodic (e.g. frame based) and deadlines exist. At the start of each period a different dynamic task set can appear, and the deadline will be the maximum execution time for that frame. An aspect of the present invention is to quantify the impact of task-scheduling on the data transfer and storage cost for an execution following this pattern and to make use of this information to explore a design space. To explore the design space a genetic algorithm (GA) is used, adapted from a generalized genetic algorithm. In accordance with an embodiment of the present invention one complete run of the GA algorithm produces an energy optimal Pareto point meeting time constraints. These time constraints are given as a parameter to the algorithm and represent the deadline of the frame. Running the algorithm several times for the same task-set but with different deadlines allows to build a complete Pareto curve. A Pareto curve can be found for each of the most common task-sets (scenarios) in an application, whose information will be used at run-time to steer the data allocation and task scheduling processes in accordance with an embodiment of the present invention. In Algorithm 2 the main flow of the exploration methodology is shown.

Building the Energy/Time Trade-off

The population of the GA algorithm consists of several potential partial task-orderings. Each task-ordering is represented with an unordered compatibility graph. The nodes of the graph correspond to the tasks in the application. If an edge between two nodes exists, the two corresponding tasks can be executed in parallel. A random set of these graphs representing inter-task restrictions form the genes of the initial population. To evaluate the fitness of a gene, a full ordering of the task-set is defined using a list scheduling approach and taking the constraints imposed by the gene into account. Subsequently, the data of the tasks is assigned to the memories and the energy and execution time of the schedule with a multi-processor simulator is evaluated. Finally, the fitness of the gene based on the current imposed deadline for the task-set is evaluated as well as its simulated execution time and energy consumption.

To create the next generation:

The best gene is always kept for the next generation.

Mutation is applied on the best 50% remaining solutions, looking for local improvements with slight modifications.

Cross-over of the worst genes sharply changing their identity.

The final solution is chosen as a Pareto point representing a configuration that minimizes the energy consumption for the given deadline. The goodness of this point depends on the number of genes per generation and the number of generations.

Task Scheduling

For each gene of each generation a task ordering graph is built. Assuming an unbound number of processors and starting with the restrictions imposed by the current task-graph, a least laxity first (llf) policy is applied, but constrained to the compatibility graph. Since only one deadline exists for the entire frame, this approach is equivalent to a longest task first policy. This is illustrated with a small task graph shown in FIG. 7. The execution time of each task is indicated inside each node. In the example, the first task to schedule is T1, at time 0. Then, according to the llf-policy, T2 should be scheduled. However, since T1 and T2 are incompatible (see FIG. 7), T2 can only be executed after T1 finishes. The algorithm therefore tries to schedule the next candidate task (T3). In this case, the compatibility graph indicates that T3 and T1 can run in parallel (see schedule in FIG. 8).

Besides a precise ordering of the tasks, the output of the algorithm also enumerates all execution phases. An execution phase is an interval of the schedule in which a fixed set of tasks is executed in parallel. For instance, in FIG. 8, four phases ($\phi 0$ to $\phi 3$) are present for the four tasks.

The list scheduler is shown in Algorithm 3. Referring to algorithm 3 in the attached drawings, the scheduler picks the candidate task with the highest execution time (line 7). It then verifies whether the candidate task is compatible with the already allocated tasks which are executed in parallel (line 8). If it is possible to schedule the task, the output is updated, a new execution phase is started and the existing ones are adapted and book keep the $OL_T$ and $OL_{AT}$ (lines 9-13). If not, the algorithm tries to schedule the remaining candidates in order of decreasing execution time. If no candidates can be found, the time is advanced until a task finishes (lines 17-18). The latter task is then removed from $OL_{AT}$, creating more freedom to schedule the remaining tasks in $OL_T$. The algorithm reattempts to schedule the remaining tasks until all tasks have been scheduled (line 6). For this algorithm, it is assumed that no dependencies exist between the tasks and that a rough estimation of the execution time of each task is available. A precise estimate is anyway unnecessary since the actual execution time of a task heavily depends on the parallel executing tasks.

Task Data Allocation

The technique of the first two embodiments is used to assign the data to the hierarchical memory, e.g. to the SDRAM banks. The data of the tasks is allocated in the longest execution phase first. This algorithm is repeated for the remaining phases by decreasing execution time. The algorithm tracks the lifetime of the data structures. For a given phase, the data structures are only allocated which are alive in that phase. When a data structure has already been allocated (during the allocation of a longer phase), the prior allocation decision is maintained. Each data structure is thus allocated only once.

The process is illustrated with the task set of FIG. 8. First, the data of the longest phase is allocated, i.e. the data of T1 in $\phi 1$. Then, it is determined where to store the data of T2 in (the second longest phase $\phi 3$). Since T1 is not active in $\phi 3$, no constraints are imposed by prior allocation decisions for T1. All banks are thus available to store the data of T2. Thereafter, the data of the active tasks (T1, T3) are allocated in $\phi 0$. Because the data structures of T1 have already been allocated in $\phi 1$, it is only necessary to decide where to place the data of T3. Finally, the data of the remaining phase ($\phi 2$) is allocated in a similar way.

Evaluation Strategy

The main goal of the simulation environment (see FIG. 3) is to study how multi-threaded applications should be mapped onto a shared memory hierarchy. The processing elements and the memory architecture are simulated independently. This allows quick exploration of different allocations of the data structures on the hierarchical memory, e.g. on the SDRAM memories while avoiding long simulation times for-the processing elements. The processing elements and their performance are simulated using an adapted instruction set simulator. This simulator dumps a memory access trace for each task in the parallel application. Each memory access in the trace is annotated with its relative issue-time. The memory traces are input together with the schedule of the corresponding tasks in the performance and energy evaluation script. This script combines the memory access traces in a cycle-accurate way according to the issue-time of each access, the task schedule and the configured memory hierarchy. It outputs the total execution time of each task (including both the processor and memory delay) and the energy consumption of the memory hierarchy.

To evaluate the effectiveness of the assignment techniques according to the present invention, representative task-sets are used. In Table 4 these are enumerated. The table shows their total energy consumption and execution time for three banks. The table contains measurements for the tasks executed on an instruction set simulator running at 100 MHz.

Design-time Generated Pareto Task Schedules

In Table 5 results are shown for the GA algorithm according to the present invention for the Cmp. Conv.Raw.2Dct task-set. Similar results for other task-sets are presented in Table 6. The results indicate that for a given number of banks a trade-off exists between execution-time and energy consumption. Note that only two out of many intermediate Pareto points are shown. As long as enough bandwidth is available to the SDRAMs, the execution time can be decreased by scheduling tasks in parallel. The more tasks are executed in parallel, the more data is alive at the same time. When the number of data structures becomes large, it becomes difficult to find an energy efficient data assignment. The accesses to data in the shared banks then start to interfere, thereby causing page-misses and increasing the dynamic energy cost and the execution time. Finally, due to contention of the accesses to the memory banks, for this example a fully parallel schedule results in a longer execution time (78510 cycles) and a higher energy cost (186 uJ) compared to the fastest partially parallel schedule (76422 cycles and 161 uJ).

The results show that the more banks are available, the lower the energy consumption becomes since a data assignment can be found more easily which reduces the number of page-misses. E.g. the energy consumption of the sequential schedule decreases from 96 uJ for two banks to 70 uJ for twelve banks. At the same time the performance is improved due to the reduced number of page-misses (from 119980 cycles to 112006 cycles). When twelve banks are used, the sequential schedule consumes more energy than a partially parallel schedule. The energy benefits created by the extra allocation freedom of a sequential schedule do not outweigh the increased static energy (70 uJ) due to a longer execution time compared to a faster, partially parallel schedule (76422 cycles and 161 uJ).

With the GA algorithm according to the present invention, a set of the "most" energy efficient schedules and corresponding data assignments can be generated for different time-budgets (under the assumption that GA finds the optimal solutions). Together these solutions form a Pareto-set of solutions, trading off time versus energy. The range of ΔE and ΔT that are shown here, clearly indicates that this effect cannot be neglected. More important is however how to exploit this property in a real system design and system related compilers. In accordance with an aspect of the present invention, these Pareto-sets can be used to deal with the dynamic behavior of multi-media applications.

Scenario Based Run-time Task Scheduling

In accordance with an embodiment of the present invention mixed design-time/run-time algorithms are provided which allow incorporation of limitations of the memory hierarchy during run-time scheduling. This is shown in algorithm 4. The technique will be explained using a small example. At design-time, which tasks-sets (scenarios) are typically occurring during the execution of the application are analyzed. The design time method according to this embodiment may be carried out on a personal computer or a workstation running software designed to carry out the method of the embodiment. In the context of the example the task-sets which can occur at run-time are indicated in Table 6.

It is assumed that the tasks of each scenario are independent of each other and that four banks are available on the target architecture. For each scenario a Pareto-set of task-schedules are generated and stored in a memory (see Table 6). During run-time at the start of a new frame and when new tasks have entered or exited the system, the scenario which is active is identified and the least energy consuming schedule selected from the Pareto-set which still satisfies the time constraints. E.g. assume that scenario 2Raw becomes active and the time-budget is 50,000 cycles. The scheduler selects then the slow solution from Table 6 with an execution time of 35739 cycles and an average energy consumption of 32 uJ. Whenever no appropriate scenario can be found, the fall back position is conventional scheduling techniques, which schedule all tasks in parallel (since no task dependencies exist). The run-time overhead of the scenario approach consists of selecting an appropriate scenario and remains limited compared to existing run-time scheduling approaches. The main aspects of this approach can thus be summarized as follows:

The existing run-time techniques are unaware of the energy cost of the memory hierarchy. As long as enough processors are available, all tasks are scheduled in parallel even when the time budget is relaxed. The execution time and energy consumption under the fully parallel reference schedule are shown in the fifth and sixth column of Table 6. The energy/performance of the proposed scenario approach has been measured after 1000 frames and compared with the prior art. The results are shown in Table 7. At the start of each frame, either a random task-set or one of the scenarios from Tab. 6 needs to be scheduled. The first set of results (top of the table) were obtained under the assumption that all the task-sets (100% prediction) which can occur at run-time are known at design-time. The precise probabilities at which each scenario occurs during run-time for the first experiments are indicated in the second column of Table 6. For the second and third set of results, it is assumed that only 70% and 20% respectively of the task-sets are known at design-time (e.g. because new tasks are arriving on the platform from external servers or other resources).

The run-time aspect of this embodiment is carried out on a target essentially digital system such as a processor with a multibank memory. The processor may be an ARM processor core, for example (see book by Furber). An operating system, such as the LINUX operating system is adapted to carry out the run-time aspects of this embodiment. The source code of LINUX operating system is available and is modified and then re-compiled for the relevant processor.

For the latter experiments the occurrence probabilities of the scenarios have been scaled with 0.7 and 0.2, respectively. Furthermore, the time constraints have been varied from 10000 to 50000 cycles and the number of deadline misses is indicated, which is also a crucial criterion for soft real-time systems. The results of the same task-sets scheduled with the scenario approach are also shown in Table 7. The results show that in this example the energy consumption can be improved up to 60% when all scenarios are known at design-time (compare 55212 uJ for the reference schedule with 30341 for the scenario approach according to this embodiment). Obviously, the fewer scenarios that can be identified at design-time, the lower the energy savings become. E.g. in case only 20% of the tasks-sets is known at design-time (last entry of Table 7), only 8% energy savings with the scenario selection technique is obtained. So the energy efficiency of this technique depends mainly on how easily relevant scenarios can be found at design-time. Particularly, the number of potential scenarios explodes whenever the applications become very dynamic. However, published results suggest that in realistic applications many scenarios are similar and can be clustered. It can also be seen that the number of deadline misses may reduce with the scenario approach. Without the scenario approach the deadline of 10000 is violated in each frame. In contrast, the number of deadline violations reduces for this particular deadline by 30% when the scenario approach is applied. For this strict time-constraint, the scenario approach can meet the deadline of the 2Conv.2Cmp task-set (see also Table 6). It selects then the fastest schedule (9440 cycles), which corresponds to a partially parallel ordering of the tasks. In contrast, the existing memory unaware schedulers schedule the tasks in parallel. The fastest schedule takes then minimally 14533 cycles, and hence it can never meet the deadline.

The design environment suitable for use with the present invention may be a personal computer or a workstation on which suitable software is running to carry out the methods of the invention. The software may execute on this environment which carries out a method for preparing memory allocation of at least two data structures for at least one task to be executed on a substantially digital system having multi-bank storage means, the at least two data structures being accessed by the at least one task. When executed the software can provide means for determining a value of a parameter representing an energy benefit related to accesses required for executing the task for each storing of each of the at least two data structures in one bank alone of the storage means, and means for determining at least one allocation of the at least two data structures to one or more banks in accordance with the determined parameters. The software may also facilitate storing of the at least one allocation. The determining of at least one allocation can include minimizing a combination of the values of the parameters per bank. The software may allow a combination which includes weighting the parameter in accordance with the size of the data structure. The multi-bank storage means can comprise at least at first and a second hierarchical storage level, the first hierarchical level serving as a buffer for the second hierarchical level, and the software when executed provides the means for determining the value of the parameter which includes means for determining the average time between misses for the first hierarchical level and the average time between accesses to the data structure. The substantially digital system having multi-bank storage means may allow a plurality of tasks to be executed, and the software when executed may comprise means for determining the value of the parameter representing an energy benefit for each of the data structures for each of the tasks, and also for minimizing the combination of values of the parameters per bank. The software, when executed may comprise means for determining of the values of the parameters for the tasks which performs this determination for a larger set of tasks than for the step of minimizing, which is applied to an active subset only which is to be active when the plurality of tasks is be executed on a substantially digital target system. The software when executed may comprise means for determining the values of the parameter for each of the data structures of each of the at least one task for at least a first and a second number of banks of the multi-bank storage means. The software, when executed may provide means such that for each task for its data structures, allocations are determined at least for the first number of banks and the second number of banks.

The software when executed can provide means such that from the obtained data allocations a selection is made that minimizes the energy consumption for executing all tasks, with the constraint that the amount of banks must be less than a predetermined number of banks while satisfying execution timing constraints. The software when executed may comprise means for selecting of an allocation for each of the banks such that: a selected energy consumption and associated execution time is one combination relating to a plurality of energy consumption-execution time operating points of a predetermined set of optimal energy consumption-execution time operating points. The plurality of energy consumption-execution time operating points can belong to a first trade-off set, wherein for any one combination of energy consumption-execution time for an operating point, all other combinations of energy consumption and execution time for all other operating points in the first trade-off set having a value of the energy consumption which is lower than the value for the one combination, have a value for the execution time which is higher than the value of execution time of the one combination, and all other combinations of energy consumption and execution time for all other operating points in the first trade-off set having a value of the energy consumption which is higher than the value for the one combination, have a value for the execution time which is lower than the value of the execution time for the one combination.

The software when executed may comprise means for a selection of allocations by exploring a plurality of schedulings of the tasks involved. There can be at least a first and a second task and the software when executed provides means for determining of the allocations by selecting, for first and second schedulings of the at least first and second task, an allocation which is determined such that: a selected allocation for a scheduling has an energy consumption and associated execution time which is one combination of a plurality of energy consumption-execution time operating points of a predetermined set of optimal energy consumption-execution time operating points. The plurality of energy consumption-execution time operating points can belong to a second trade-off set, wherein for any one combination of energy consumption-execution time for an operating point, all other combinations of energy consumption and execution time for all other operating points in the second trade-off set having a value of the energy consumption which is lower than the value for the one combination, have a value for the execution time which is higher than the value of execution time of the one combination, and all other combinations of energy consumption and execution time for all other operating points in the second trade-off set having a value of the energy consumption which is higher than the value for the one combination, have a value for the execution time which is lower than the value of the execution time for the one combination.

Although in the above the design environment is considered different from the target run-time device, the present invention includes that the same device is used for design and run-time implementations.

The invention claimed is:

1. A method of preparing memory allocation of at least two data structures for at least one task to be executed on a substantially digital system having a multi-bank storage, the at least two data structures being accessed by the at least one task, comprising:
   determining a value of a parameter representing an energy benefit related to accesses required for executing the task for each storing of each of the at least two data structures in one bank alone of the storage; and
   determining at least one allocation of the at least two data structures to one or more banks in accordance with the determined parameters,
   wherein the parameter is a measure of the spatial locality of an access pattern of the data structure when executing the task, wherein the parameter is also a measure of a temporal locality of accesses to the data structure when executing the task.

2. The method of claim 1, further comprising storing the at least one allocation.

3. The method according to claim 1, wherein the determining of at least one allocation includes minimizing a combination of the values of the parameters per bank.

4. The method according to claim 3, wherein the combination includes weighting the parameter in accordance with the size of the data structure.

5. The method according to claim 1, wherein for each allocation, run-time execution time information is stored with the allocation.

6. The method of claim 5, wherein the run-time execution information is an estimate of the time necessary to execute the at least one task when using the allocation.

7. A method of executing one or more tasks accessing data structures on a substantially digital system having a processor and a multi-bank storage, and a store of memory allocations of the data structures to be accessed, the memory allocations having been determined by a method in accordance with claim 1, the method comprising:
   loading the one or more tasks;
   accessing the store of memory allocations; and
   selecting a memory allocation to the multi-bank storage for one or more data structures accessed by the one or more task in accordance with a trade-off between energy required for accessing the multi-bank storage and a requirement on the execution time.

8. The method according to claim 7, wherein a selected energy consumption and associated execution time is one combination of a plurality of energy consumption-execution time operating points of a predetermined set of optimal energy consumption-execution time operating points.

9. The method according to claim 8, wherein the plurality of energy consumption-execution time operating points belong to a third trade-off set, wherein for any one combination of energy consumption-execution time for an operating point, all other combinations of energy consumption and execution time for all other operating points in the third trade-off set having a value of the energy consumption which is lower than the value for the one combination, have a value for the execution time which is higher than the value of execution time of the one combination, and all other combinations of energy consumption and execution time for all other operating points in the third trade-off set having a value of the energy consumption which is higher than the value for the one combination, have a value for the execution time which is lower than the value of the execution time for the one combination.

10. The method according to claim 7, further comprising storing the schedulings and associated memory allocations, and executing at least a first and a second task in accordance with a scheduling associated with the selected memory allocation.

11. A method of preparing memory allocation of at least two data structures for a plurality of tasks to be executed on a substantially digital system having a multi-bank storage, the at least two data structures being accessed by the at least one task, comprising:
   determining a value of a parameter representing an energy benefit related to accesses required for executing the task for each storing of each of the at least two data structures in one bank alone of the storage;
   determining at least one allocation of the at least two data structures to one or more banks in accordance with the determined parameters;
   determining the value of the parameter representing an energy benefit for each of the data structures for each of the tasks; and
   minimizing the combination of values of the parameters per bank,
   wherein satisfying the timing constraints is determined by comparing the restraint on run time execution time with the run time execution information,
   wherein, from the obtained data allocations a selection is made that minimizes the energy consumption for executing all tasks, with the constraint that the amount of banks must be less than a predetermined number of banks while satisfying execution timing constraints.

12. A method of preparing memory allocation of at least two data structures for a plurality of tasks to be executed on a substantially digital system having a multi-bank storage, the at least two data structures being accessed by the at least one task, comprising:
   determining a value of a parameter representing an energy benefit related to accesses required for executing the task for each storing of each of the at least two data structures in one bank alone of the storage;
   determining at least one allocation of the at least two data structures to one or more banks in accordance with the determined parameters;
   determining the value of the parameter representing an energy benefit for each of the data structures for each of the tasks; and
   minimizing the combination of values of the parameters per bank,
   wherein, from the obtained data allocations a selection is made that minimizes the energy consumption for executing all tasks, with the constraint that the amount of banks must be less than a predetermined number of banks while satisfying execution timing constraints,
   wherein the selecting of an allocation for each of the banks comprises:
   a selected energy consumption and associated execution time is one combination relating to a plurality of energy consumption-execution time operating points of a predetermined set of optimal energy consumption-execution time operating points.

13. The method according to claim 12, wherein the plurality of energy consumption-execution time operating points belong to a first trade-off set, wherein for any one combination of energy consumption-execution time for an operating point, all other combinations of energy consumption and execution time for all other operating points in the first trade-off set having a value of the energy consumption which is lower than the value for the one combination, have a value for the execution time which is higher than the value of execution time of the one combination, and all other combinations of energy consumption and execution time for all other operating points in the first trade-off set having a value of the energy consumption which is higher than the value for the one combination, have a value for the execution time which is lower than the value of the execution time for the one combination.

14. A method of preparing memory allocation of at least two data structures for a plurality of tasks to be executed on a substantially digital system having a multi-bank storage, the at least two data structures being accessed by the at least one task, comprising:
   determining a value of a parameter representing an energy benefit related to accesses required for executing the task for each storing of each of the at least two data structures in one bank alone of the storage;
   determining at least one allocation of the at least two data structures to one or more banks in accordance with the determined parameters;
   determining the value of the parameter representing an energy benefit for each of the data structures for each of the tasks; and
   minimizing the combination of values of the parameters per bank,
   wherein a selection of allocations is made by exploring a plurality of schedulings of the tasks involved.

15. The method according to claim 14, wherein there is at least a first and a second task and the determining of the allocations includes selecting for first and second schedulings of the at least first and second task an allocation which is determined by: a selected allocation for a scheduling has an energy consumption and associated execution time which is one combination of a plurality of energy consumption-execution time operating points of a predetermined set of optimal energy consumption-execution time operating points.

16. The method according to claim 15, wherein the plurality of energy consumption-execution time operating points belong to a second trade-off set, wherein for any one combination of energy consumption-execution time for an operating point, all other combinations of energy consumption and execution time for all other operating points in the second trade-off set having a value of the energy consumption which is lower than the value for the one combination, have a value for the execution time which is higher than the value of execution time of the one combination, and all other combinations of energy consumption and execution time for all other operating points in the second trade-off set having a value of the energy consumption which is higher than the value for the one combination, have a value for the execution time which is lower than the value of the execution time for the one combination.

17. A method of preparing memory allocation of at least two data structures for at least one task to be executed on a substantially digital system having a multi-bank storage, the at least two data structures being accessed by the at least one task, comprising:
   determining a value of a parameter representing an energy benefit related to accesses required for executing the task for each storing of each of the at least two data structures in one bank alone of the storage; and determining at least one allocation of the at least two data structures to one or more banks in accordance with the determined parameters, wherein for each allocation, run-time execution time information is stored with the allocation.

18. The method of claim 17, wherein the run-time execution information is an estimate of the time necessary to execute the at least one task when using the allocation.

19. A method of preparing memory allocation of at least two data structures for a plurality of tasks to be executed on a substantially digital system having a multi-bank storage, the at least two data structures being accessed by the at least one task, comprising:

determining a value of a parameter representing an energy benefit related to accesses required for executing the task for each storing of each of the at least two data structures in one bank alone of the storage; and determining at least one allocation of the at least two data structures to one or more banks in accordance with the determined parameters, determining the value of the parameter representing an energy benefit for each of the data structures for each of the tasks, and minimizing the combination of values of the parameters per bank, wherein the determining of the values of the parameters for the tasks is performed for a larger set of tasks than for the minimizing, which is applied to an active subset only which is to be active when the plurality of tasks is be executed on the substantially digital system.

20. The method according to claim 19, wherein for each allocation, run-time execution time information is stored with the allocation.

21. The method of claim 20, wherein the run-time execution information is an estimate of the time necessary to execute the at least one task when using the allocation.

22. The method according to claim 19, wherein, from the obtained data allocations a selection is made that minimizes the energy consumption for executing all tasks, with the constraint that the amount of banks must be less than a predetermined number of banks while satisfying execution timing constraints.

23. The method of claim 22, wherein the predetermined number of banks is the number of banks for a target substantially digital device on which the task is to be executed.

24. A method of preparing memory allocation of at least two data structures for at least one task to be executed on a substantially digital system having a multi-bank storage, the at least two data structures being accessed by the at least one task, comprising:

determining a value of a parameter representing an energy benefit related to accesses required for executing the task for each storing of each of the at least two data structures in one bank alone of the storage;

determining at least one allocation of the at least two data structures to one or more banks in accordance with the determined parameters;

determining the values of the parameter for each of the data structures of each of the at least one task for at least a first and a second number of banks with the multi-bank storage; and at run time on the substantially digital system, selecting either the first or second number of banks for execution of the at least one task.

25. The method according to claim 24, wherein for each task for its data structures, allocations are determined at least for the first number of banks and the second number of banks.

26. The method according to claim 24, wherein for each allocation, run-time execution time information is stored with the allocation.

27. The method of claim 26, wherein the run-time execution information is an estimate of the time necessary to execute the at least one task when using the allocation.

* * * * *